US010871307B2

(12) United States Patent
Hawkins et al.

(10) Patent No.: US 10,871,307 B2
(45) Date of Patent: Dec. 22, 2020

(54) APPARATUS AND METHODS FOR HEATING WATER WITH REFRIGERANT FROM AIR CONDITIONING SYSTEM

(71) Applicant: Rheem Manufacturing Company, Atlanta, GA (US)

(72) Inventors: Timothy B. Hawkins, Fort Smith, AR (US); Jeremy L. Babb, Fort Smith, AR (US)

(73) Assignee: Rheem Manufacturing Company, Atlanta, GA (US)

(*) Notice: Subject to any disclaimer, the term of this patent is extended or adjusted under 35 U.S.C. 154(b) by 303 days.

(21) Appl. No.: 15/882,756

(22) Filed: Jan. 29, 2018

(65) Prior Publication Data

US 2018/0252434 A1 Sep. 6, 2018

Related U.S. Application Data

(63) Continuation of application No. 14/210,383, filed on Mar. 13, 2014, now Pat. No. 9,879,881.

(Continued)

(51) Int. Cl.
*F24H 4/02* (2006.01)
*F25B 13/00* (2006.01)
(Continued)

(52) U.S. Cl.
CPC ............ *F24H 4/02* (2013.01); *F24D 15/04* (2013.01); *F24D 17/0005* (2013.01); *F24D 17/0031* (2013.01); *F24D 17/02* (2013.01); *F24D 19/1054* (2013.01); *F24F 5/0096* (2013.01); *F24H 4/04* (2013.01); *F24H 6/00* (2013.01); *F25B 5/04* (2013.01); *F25B 13/00* (2013.01); *F25B 29/00* (2013.01); *F25B 29/003* (2013.01); *F25B 41/04* (2013.01); *F25B 49/027* (2013.01);
(Continued)

(58) Field of Classification Search
CPC ............................ F24D 17/02; F24D 17/0036
See application file for complete search history.

(56) References Cited

U.S. PATENT DOCUMENTS 2,375,157 A  5/1945 Wilkes et al.
3,308,877 A * 3/1967 Gerteis .................. F24F 5/00
                                                                165/240

(Continued)

FOREIGN PATENT DOCUMENTS

CN    1568417   1/2005
CN    1609518   4/2005
(Continued)

OTHER PUBLICATIONS

International Search Report and Written Opinion issued for PCT/US2014/018699, dated Jun. 13, 2014.

(Continued)

*Primary Examiner* — Christopher R Zerphey
(74) *Attorney, Agent, or Firm* — Troutman Pepper Hamilton Sanders LLP

(57) ABSTRACT

An apparatus for heating water has a tank for storing water and an air conditioning system that defines a refrigerant flow path through which refrigerant flows. The refrigerant flow path passes through the heat exchanger so that refrigerant heat is contributed to the tank. A control system controls operation of the water heating apparatus.

15 Claims, 13 Drawing Sheets

Related U.S. Application Data

(60) Provisional application No. 61/779,087, filed on Mar. 13, 2013.

(51) Int. Cl.

| | | |
|---|---|---|
| *F25B 49/02* | (2006.01) | |
| *F28D 1/06* | (2006.01) | |
| *F24F 5/00* | (2006.01) | |
| *F24H 6/00* | (2006.01) | |
| *F24D 15/04* | (2006.01) | |
| *F24D 19/10* | (2006.01) | |
| *F24D 17/02* | (2006.01) | |
| *F25B 5/04* | (2006.01) | |
| *F25B 29/00* | (2006.01) | |
| *F25B 41/04* | (2006.01) | |
| *F24H 4/04* | (2006.01) | |
| *F24D 17/00* | (2006.01) | |

(52) U.S. Cl.
CPC ............ F28D 1/06 (2013.01); *F24D 2200/04* (2013.01); *F24D 2200/08* (2013.01); *F24D 2200/123* (2013.01); *F24D 2200/24* (2013.01); *F24F 2221/183* (2013.01); *F25B 2339/047* (2013.01); *F25B 2400/0403* (2013.01); *F25B 2600/2501* (2013.01); *Y02B 10/70* (2013.01); *Y02B 30/12* (2013.01); *Y02B 30/52* (2013.01)

(56) References Cited

U.S. PATENT DOCUMENTS

| | | | |
|---|---|---|---|
| 4,012,920 A | 3/1977 | Kirschbaum | |
| 4,215,551 A | 8/1980 | Jones | |
| 4,227,382 A | 10/1980 | Coyne | |
| 4,238,933 A | 12/1980 | Coombs | |
| 4,241,588 A | 12/1980 | Murphy et al. | |
| 4,281,519 A | 8/1981 | Spath et al. | |
| 4,293,323 A | 10/1981 | Cohen | |
| 4,350,024 A | 9/1982 | Moll | |
| 4,356,706 A | 11/1982 | Baumgarten | |
| 4,386,500 A | 6/1983 | Sigafoose | |
| 4,391,104 A | 7/1983 | Wendschlag | |
| 4,448,347 A | 5/1984 | Dunstan | |
| 4,449,375 A | 5/1984 | Briccetti | |
| 4,452,050 A | 6/1984 | Pierce | |
| 4,575,001 A | 3/1986 | Oskarsson et al. | |
| 4,599,870 A | 7/1986 | Hebert et al. | |
| 4,645,908 A | 2/1987 | Jones | |
| 4,693,089 A | 9/1987 | Bourne et al. | |
| 4,943,003 A * | 7/1990 | Shimizu | F24D 5/12 237/2 B |
| 5,003,788 A | 4/1991 | Fischer | |
| 5,050,394 A | 9/1991 | Dudley et al. | |
| 5,081,846 A | 1/1992 | Dudley et al. | |
| 5,105,633 A | 4/1992 | Briggs | |
| 5,269,153 A | 12/1993 | Cawley | |
| 5,495,723 A | 3/1996 | MacDonald | |
| 5,526,649 A | 6/1996 | Sada | |
| 5,575,159 A | 11/1996 | Dittell | |
| 5,628,200 A | 5/1997 | Pendergrass | |
| 5,755,111 A | 5/1998 | Toyama | |
| 5,906,104 A | 5/1999 | Schwartz et al. | |
| 6,357,245 B1 | 3/2002 | Weng | |
| 7,040,108 B1 | 5/2006 | Flammang | |
| 7,721,560 B2 | 5/2010 | Carpenter | |
| 8,037,931 B2 | 10/2011 | Penev et al. | |
| 8,356,481 B2 | 1/2013 | Penev | |
| 9,188,373 B2 * | 11/2015 | Garrabrant | F24D 12/02 |
| 2002/0092311 A1 | 7/2002 | James | |
| 2004/0144528 A1 | 7/2004 | Kunimoto | |
| 2004/0177628 A1 | 9/2004 | Kurata et al. | |
| 2005/0109490 A1 * | 5/2005 | Harmon | F24F 5/0096 165/133 |
| 2005/0183432 A1 | 8/2005 | Cowans et al. | |
| 2006/0042285 A1 | 3/2006 | Heberie | |
| 2006/0064995 A1 | 3/2006 | Rigal et al. | |
| 2006/0179874 A1 | 8/2006 | Barger | |
| 2006/0191495 A1 | 8/2006 | Sun | |
| 2006/0213210 A1 | 9/2006 | Tomlinson et al. | |
| 2007/0068178 A1 | 3/2007 | Honma et al. | |
| 2008/0104986 A1 | 5/2008 | Gordon et al. | |
| 2008/0236185 A1 | 10/2008 | Choi et al. | |
| 2008/0245087 A1 | 10/2008 | Orcutt | |
| 2009/0026281 A1 | 1/2009 | McGreevy | |
| 2009/0120110 A1 | 5/2009 | Grabon et al. | |
| 2009/0049857 A1 | 10/2009 | Cowans | |
| 2010/0000709 A1 | 1/2010 | Chang | |
| 2010/0083950 A1 | 4/2010 | Bloxam | |
| 2010/0209084 A1 | 8/2010 | Nelson et al. | |
| 2011/0120168 A1 | 5/2011 | Choi et al. | |
| 2011/0259025 A1 | 10/2011 | Noh et al. | |
| 2012/0060521 A1 | 3/2012 | Roetker et al. | |
| 2012/0102991 A1 | 5/2012 | Lee et al. | |
| 2012/0312045 A1 | 12/2012 | Kim | |
| 2013/0104574 A1 | 5/2013 | Dempsey et al. | |
| 2014/0230477 A1 | 8/2014 | Furui | |
| 2014/0260358 A1 | 9/2014 | Leete et al. | |
| 2014/0260392 A1 | 9/2014 | Hawkins et al. | |

FOREIGN PATENT DOCUMENTS

| | | |
|---|---|---|
| CN | 200972229 | 11/2007 |
| CN | 101614451 | 12/2009 |
| DE | 10058273 | 5/2002 |
| EP | 0138568 | 4/1985 |
| EP | 0151493 | 8/1985 |
| EP | 0240441 | 10/1987 |
| EP | 2103884 | 9/2009 |
| EP | 2360439 | 8/2011 |
| EP | 2489972 | 8/2012 |
| EP | 2538145 | 12/2012 |
| JP | H11270920 | 10/1999 |
| JP | 2011094931 | 5/2011 |
| WO | WO 9002300 | 3/1990 |
| WO | WO 2003036178 | 5/2003 |
| WO | WO 2006039580 | 4/2006 |
| WO | WO 2006128263 | 12/2006 |
| WO | WO 2006128264 | 12/2006 |
| WO | WO 2007146050 | 12/2007 |
| WO | WO 2010093516 | 8/2010 |
| WO | WO 2012041225 | 4/2012 |
| WO | WO 2013061473 | 5/2013 |

OTHER PUBLICATIONS

Rheem, "Integrated Air & Water System" Form No. S11-945, Jan. 2012, 60 pages.
Extended European Search Report for EP Application No. 14773958.5 dated Apr. 10, 2017.
First Office Action dated Jan. 17, 2017 for Chinese Application No. 201480024058.8.
Second Examination Report dated Mar. 17, 2017 for Australian Application No. 2014243719.
Examiner's Requisition dated Jun. 28, 2017 for Canadian Application No. 2,906,662.
Canadian Office Action dated Aug. 23, 2016, for corresponding Application No. 2,906,662.
Pre-Examination Processing Notice (detailed) dated Feb. 15, 2016 for Australian Application No. 2014243719.
International Search Report and Written Opinion for corresponding PCT Application PCT/US2014/026894, dated Jul. 15, 2014.

* cited by examiner

APPARATUS AND METHODS FOR HEATING WATER WITH REFRIGERANT FROM AIR CONDITIONING SYSTEM

The present application is a continuation application of and claims priority to U.S. patent application Ser. No. 14/210,383, filed Mar. 13, 2014, which is now U.S. Pat. No. 9,879,881 issued Jan. 30, 2018, which claims the benefit of the filing date of provisional U.S. Patent Application No. 61/779,087, filed Mar. 13, 2013. The entire disclosure of the foregoing applications is hereby incorporated herein for all purposes.

BACKGROUND OF THE PRESENT INVENTION

Various apparatus and methods have been previously proposed for pre-heating water in a water heater tank using refrigerant from air conditioning apparatus such as an air conditioner with a non-reversible refrigerant circuit or a heat pump having a reversible refrigerant circuit. However, such previously proposed apparatus and methods have often proven to be undesirably complex and expensive for use in many applications.

SUMMARY OF THE INVENTION

An embodiment of an apparatus for heating water according to the present invention includes a tank for storing water, and a heater exchanger in thermal communication with the tank and configured to receive refrigerant and transfer heat therefrom to the tank. An air conditioning system has an air handler actuatable to move an air flow through an air flow path into a conditioned space. A refrigerant path has a first portion that passes through the air flow path and a second portion that passes through the heat exchanger. A pump is disposed in the refrigerant path and is actuatable to move refrigerant through the refrigerant path. A control system is in operative communication with the air handler to control actuation of the air handler and is in operative communication with the pump to control actuation of the pump. In a first mode of operation, the control system actuates the air handler to move the air flow through the air flow path and actuates the pump to move refrigerant through the first portion of the refrigerant path and the second portion of the refrigerant path. In a second mode of operation, the control system maintains the air handler in an inactive state and actuates the pump to move refrigerant through the first portion of the refrigerant path and the second portion of the refrigerant path.

In a further embodiment, an apparatus for heating water includes a tank for storing water and a temperature sensor in thermal communication with water in the tank and configured to output a first signal corresponding to temperature of the water. A heat exchanger is in thermal communication with the tank and is configured to receive refrigerant and transfer heat therefrom to the tank. An air conditioning system has an air handler actuatable to move an air flow through an air flow path into a conditioned space. A refrigerant path has a first portion that passes through the air flow path and a second portion that passes through the heat exchanger. A valve system within the refrigerant path controls refrigerant flow to the first portion and the second portion and is selectively configurable to alternatively allow refrigerant flow through the second portion and block refrigerant flow through the second portion. A pump is disposed in the refrigerant path and is actuatable to move refrigerant through the refrigerant path. A thermostat is operable to measure ambient temperature in the conditioned space and to output a second signal corresponding to ambient temperature in the conditioned space. A control system is in operative communication with the tank to receive the first signal, is in operative communication with the air handler to control actuation of the air handler, is in operative communication with the pump to control actuation of the pump, is in operative communication with the valve system to selectively allow refrigerant flow through the second portion and block refrigerant flow through the second portion, and is in operative communication with the thermostat to receive the second signals. In response to the first and second signals, in a first mode of operation, the control system actuates the air handler to move the air flow through the air flow path, actuates the pump to move refrigerant through the refrigerant path, and configures the valve system to allow refrigerant flow through the second portion. In a second mode of operation, the control system maintains the air handler in an inactive state, actuates the pump to move refrigerant through the refrigerant path, and configures the valve system to allow refrigerant flow through the second portion. In a third mode of operation, the control system actuates the air handler to move the air flow through the air flow path, actuates the pump to move refrigerant through the refrigerant path, and configures the valve system to block refrigerant flow through the second portion.

In a further embodiment, an apparatus for heating water has a tank for storing water and having a heat source. A heat exchanger is in thermal communication with the tank and is configured to receive refrigerant and transfer heat therefrom to the tank. An air conditioning system has an air handler actuatable to move an air flow through an air flow path into a conditioned space. A refrigerant path has a first portion that passes through the air flow path and a second portion that passes through the heat exchanger. A pump is disposed in the refrigerant path and is actuatable to move refrigerant through the refrigerant path. A plurality of sensors respectively output signals representative of respective system operating parameters. A control system is in operative communication with the tank to control operation of the heat source, is in operative communication with the air handler to control actuation of the air handler, is in operative communication with the sensors to receive the respective signals, and is in operative communication with the refrigerant path to control refrigerant flow. In response to the signals from the sensors, the control system selectively allows or blocks refrigerant flow through the second portion and selectively actuates the water heater heat source.

In a still further embodiment, an apparatus for heating water has a tank for storing water and having a heat source. A heat exchanger is in thermal communication with the tank and is configured to receive refrigerant and transfer heat therefrom to the tank. An air conditioning system has an air handler actuatable to move an air flow through an air flow path into a conditioned space. A refrigerant path has a first portion that passes through the air flow path and a second portion that passes through the heat exchanger. A pump is disposed in the refrigerant path and is actuatable to move refrigerant through the refrigerant path. A valve system within the refrigerant path controls refrigerant flow in the first portion and the second portion and is selectively configurable to alternatively allow refrigerant flow through the second portion and block refrigerant flow through the second portion. A plurality of sensors each outputs a respective signal representative of a respective system operating parameter that varies in a predetermined relationship with operating efficiency of at least one of the tank and the air conditioning system. A control system is in operative communication with the tank to control operation of the heat source, is in operative communication with the air handler to control actuation of the air handler, is in operative communication with the sensors to receive the respective signals, and is in operative communication with the valve system to control refrigerant flow. In response to the respective signals from sensors, the control system selectively actuates the valve system to allow refrigerant flow through the second portion or block refrigerant flow through the second portion and selectively actuates the water heater heat source.

The accompanying drawings, which are incorporated in and constitute a part of this specification, illustrate one or more embodiments of the present invention.

BRIEF DESCRIPTION OF THE DRAWINGS

Aspects of the present invention can be better understood with reference to the following drawings. The components in the drawings are not necessarily to scale. An enabling disclosure of the present invention, including the best mode thereof, is set forth in the specification, which makes reference to the appended drawings, in which.

Figure 1:
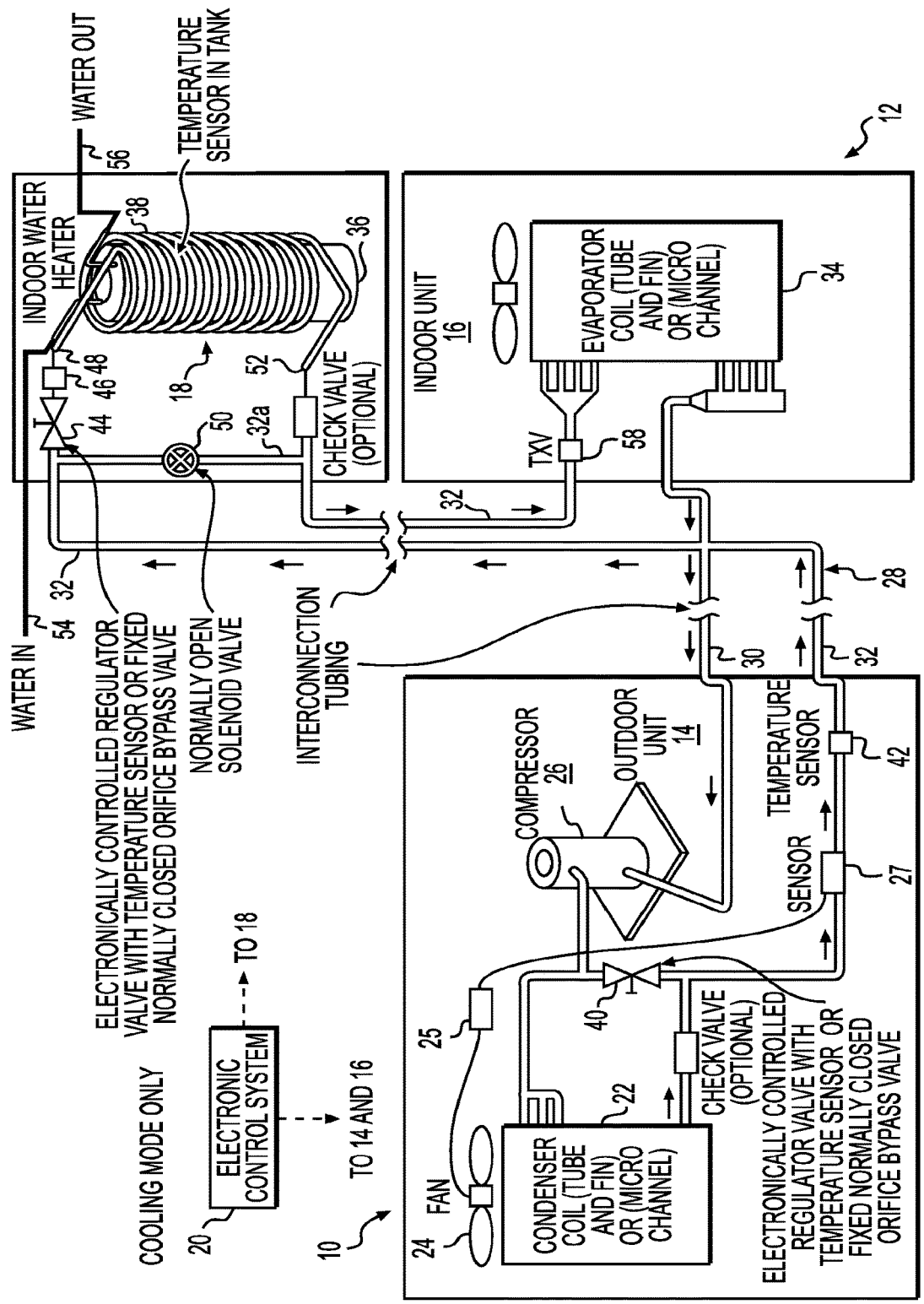
FIG. 1 is a schematic view of an air conditioning system according to an embodiment of the present invention, with an air conditioning system providing only conditioned space air conditioning.

Repeat use of reference characters in the present specification and drawings is intended to represent same or analogous features or elements of embodiments of the present invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in such examples without departing from the scope or spirit thereof. For instance, features illustrated or described as part of one embodiment may be used on another embodiment to yield a still further embodiment. Thus, it is intended that the present invention covers such modifications and variations as come within the scope of the appended claims and there equivalents.

As used herein, the terms "air conditioning" apparatus, system, etc. encompass apparatus useable to change the temperature of air being delivered to a conditioned space and having an associated refrigerant circuit. Thus, an "air conditioning" apparatus or system may comprise, without limitation, (1) an air conditioning unit (or "air conditioner") having a non-reversible refrigerant circuit that may be used to cool air delivered to a conditioned space, or (2) a heat pump having a reversible refrigerant circuit that may be used to heat or cool air delivered to a conditioned space.

Residential and commercial air conditioning systems capture heat at some point in the refrigerant's continuous cycle and transfer the heat to a point inside or outside the building, depending upon whether the system is functioning in a cooling mode or, if capable of dual modes, in a heating mode. In carrying out principles of one or more embodiments of the present invention, a portion of that heat may be captured and used to heat water in the building's water heater to a temperature at or, more often, below a high set point temperature of the water heater. An electric element or gas burner in the water heater may provide additional heat to bring the water temperature up to the water heater's high set point temperature.

Figure 2:
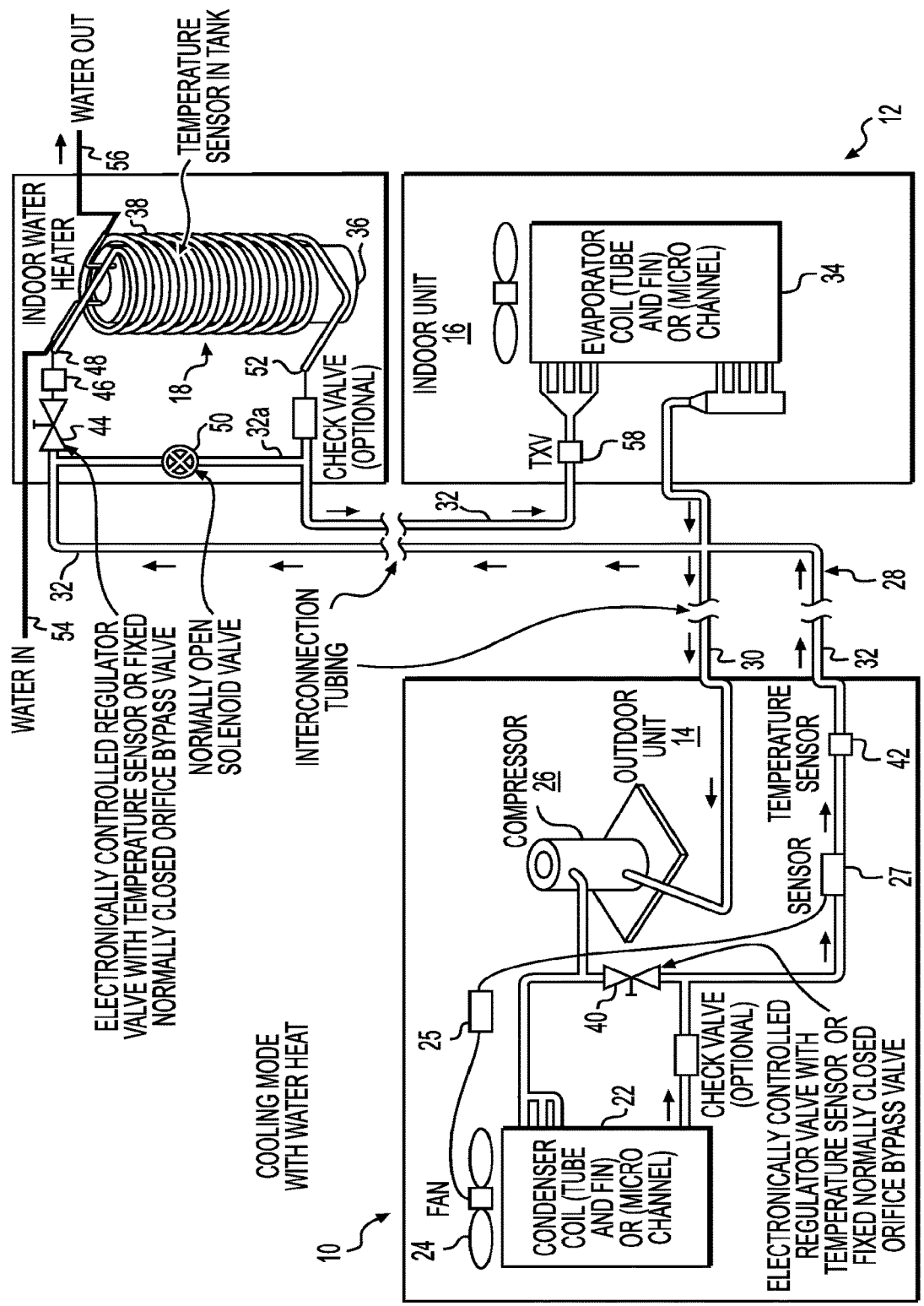
FIG. 2 is a schematic diagram of the system as in FIG. 1, but with the air conditioning system providing conditioned space air and providing refrigerant heat to a water heater.

An air conditioning/water heater system 10 embodying principles of an embodiment of the present invention is schematically depicted in FIGS. 1 and 2 and includes (1) an air conditioning system 12 having an outdoor condensing coil unit 14 and an indoor evaporating coil unit 16, and (2) an associated water heater 18 which, representatively, may be a gas-fired or electric water heater. In FIG. 1, air conditioning system 12 is arranged so that it operates in an air cooling mode only, and in FIG. 2 is in an air cooling mode and further provides supplemental, refrigerant-based heat to water heater 18. The various functions of air conditioning/water heater system 10 are controlled by a schematically depicted electronic control circuit 20 (shown only in FIG. 1) that operates various subsequently described components of the overall system 10.

As should be understood, an air conditioning system, from the standpoint of refrigerant flow, comprises a closed loop of refrigerant flowing among a compressor (i.e. a pump), a condenser coil, and an evaporator coil. In so-called split systems, one of the two coils is disposed inside the enclosure that is receiving conditioned air (the conditioned space, e.g. a building interior space), in association with an air handler, while the other coil is disposed outside the enclosure of the conditioned space, in the ambient environment. The compressor may be inside or outside the enclosure, such as a building interior, but is typically outside in a housing that also encloses the outside coil. In a system configured only to cool, the outdoor coil is the condenser, and the indoor coil is an evaporator. Refrigerant flows from the compressor, to the outdoor condenser coil, to the indoor evaporator coil, and back to the compressor. The outdoor unit includes a fan that draws ambient air across the condenser coils to draw heat from the coils. As will be understood, the refrigerant acquires this heat in part from the indoor air at the evaporator as the liquid refrigerant evaporates in the coil in response to the influence of an expansion valve at the coil's input. As the system's air handler fan moves the building's recirculating air over the evaporator coils as the refrigerant changes phase from liquid to gas, the refrigerant removes energy (i.e. heat) from the indoor air, thereby cooling the air as it is forced back into the building's conditioned space. The warm refrigerant gas then flows from the evaporator coil to the compressor, which receives the gas and pumps it back to the condenser, adding pressure and heat. In embodiments in which the air conditioning system operates as a heat pump, refrigerant lines between the compressor and the condenser, and between the compressor and the evaporator, pass through a reversing valve so that, when switching from cooling mode to a heating mode, the control system actuates the reversing valve to direct the compressor output to the indoor coil, rather than to the outdoor coil. The roles of the indoor and outdoor coils reverse from those the coils have in air cooling modes, but the sequence of compressor-condenser-evaporator-compressor remains.

As noted, the condenser cools the refrigerant, thereby dissipating the refrigerant's acquired heat (from the evaporator and the compressor) to the ambient environment via the air flow that the fan moves over the coil. The temperature reduction in the condenser also reduces the refrigerant's volume, in turn reducing its pressure, but the refrigerant flow path length and tubing dimensions, and the compressor's size and strength, are selected so that sufficient positive and negative pressure remain at the condenser's output and input to continue refrigerant flow to the evaporator and therefrom back to the compressor. The selection of such system components and operating parameters to enable desired heat transfer and recirculating refrigerant flow through the flow circuit should be well understood in this art. While it should be understood that the air conditioning systems described below are designed to provide sufficient heat transfer and pressure to maintain system operation, these variables are not discussed further herein.

One or more embodiments of the present invention described herein insert into the refrigerant path a cooling coil that is proximate a water heater to be in thermal communication with the water heater tank and thereby transfer heat from the flowing refrigerant to water in the tank. The addition of the cooling coil does not disrupt the air conditioning system's underlying compressor-condenser-evaporator-compressor sequence, but it is nonetheless encompassed within the present disclosure to use a single coil, wrapped around a water heater tank and functioning as both the heat exchanger and the air conditioning system condenser, in conditions where the heat exchanger provides sufficient cooling for the air conditioning system's condenser needs and where the air conditioning system does not require air flow over the condenser. Thus, although the present disclosure primarily discusses examples having a fan-driven system condenser and a distinct water heater heat transfer coil, it should be understood that other arrangements fall within the present disclosure.

Although the presently-described embodiments are discussed in the context of split-type air conditioning systems, it should be understood that the present disclosure encompasses air conditioning systems in which the condenser and evaporator coils may be located in the same housing.

Control system 20 may comprise a programmable logic controller (PLC) that operates as the general system controller. Housed, for example, with outdoor unit 14, the PLC communicates with and controls (via suitable electrical connections, relays, power sources, and other electromechanical connections, as should be understood in this art) the actuation and operation of the components described herein, including but not limited to the compressor, outdoor coil fan, indoor coil fan, and all electrically controlled valves. As such, the control system communicates with and controls the air conditioning system, including the valve system within the refrigerant flow path that, in conjunction with the compressor (also controlled by the control system) controls refrigerant flow. The reference to connections between control system 20 and each of outdoor unit 14, indoor unit 16, and water heater 18 (and between control system 70 and each of outdoor unit 64, indoor unit 66, and water heater 68, and between control system 120 and each of outdoor unit 114, indoor unit 116, and water heater 138) encompass such communications and control. Such communication may also encompass communication between the control system and a temperature sensor at the outdoor unit, which provides a signal to the control system corresponding to temperatures of the outdoor unit's ambient environment. Furthermore, control system 20 receives input signals from one or more thermostats in the building's conditioned space that provide instructions regarding whether to activate the air conditioning system, deactivate the air conditioning system, actuate the air handler fan, operate the system in air cooling mode, and (where the air conditioning system is a heat pump) operate the system in air heating mode. The thermostat, being located in the conditioned space and including a temperature sensor, may also output to the control system a signal corresponding to temperature of the conditioned space. The operation of thermostats in generating such instructions should be well understood and is, therefore, not discussed further herein. The thermostat may be considered a part of control system 20, and, in any event, functions typically performed by the thermostat can be shared or performed by control system 20. The reference to communication between controller 20 and indoor unit 16 (and between control system 70 and indoor unit 66, and between control system 120 and indoor unit 116) encompass such communications between the control system and the thermostat(s), as well as communication between the control system and the air handler and between the control system and the water heater. The control system activates and deactivates the air handler, based on the air conditioning system programming in response to signals from the thermostat and possibly signals from sensors indicating system operating parameters, as should be understood. In an inactive state, the air handler does not force air into, draw air into, or otherwise move air through the conditioned space. As discussed herein, actuation of the air conditioning system may refer to activation of the compressor to move refrigerant through the refrigerant path, activation of the condenser fan, and activation of the air handler (fan), in certain embodiments. But as discussed herein, in some circumstances the air conditioning system may be actuated without activating the air handler. In that sense, the control system activates the air conditioning system while maintaining the air handler in an inactive state.

Reference to communication between controller 20/50/120 and indoor unit 16/66/116 also encompasses communication between the control system and the water heater, e.g. the water heater controller or, particularly where the water heater controller's functions are incorporated by the control system, between the control system and the water heater temperature sensor(s) and heat source(s). As should be understood, water heater 18 may include an electronic controller (not shown) that can receive manual or electronic instructions to activate and deactivate a water heater and can respond to such instructions as well as activating and deactivating the water heater in response to pre-programmed set point temperatures. The water heater's high and low set point temperatures are typically capable of manual or electronic setting by the operator and/or at installation. Once set, the water heater's controller monitors the output of one or more temperature sensors in thermal communication with water inside the water heater and compares the water temperature with the predetermined set points. If the water heater is in an inactive state, and if the water tank temperature is above the water heater's low set point, the water heater controller takes no action until the water tank temperature reaches or falls below the low set point. At this point, the water heater controller activates the water heater's internal heat source, which begins to heat the water. The water heater controller continues to receive and monitor water temperature signals from the one or more water heater temperature sensors, and maintains the water heater heat source active until the controller receives a signal from the one or more temperature sensors indicating that the water heater temperature has exceeded the high set point. The water heater goes back to an inactive mode and does not reactivate until manually activated or until the signal from the one or more temperature sensors indicates that the water temperature has again fallen to or below the low set point.

In the presently described embodiments, however, the water heater controller passes the water heater temperature sensor signals or corresponding data to control system 20/70/120, which then determines whether to heat the water heater with refrigerant heat or with the water heater's inherent heat source, as described above. If, or when, the control system decides to operate the water heater heat source, the control system sends a corresponding signal to the water heater controller, which actuates the heat source. The water heater controller may thereafter monitor water temperature and deactivate the heat source when the temperature reaches the high set point, or it may continue to pass the temperature signal or data to the control system, which makes the decision when to deactivate the water heater heat source and sends an appropriate instruction signal to the water heater controller. Still further, the water heater controller may be omitted, and the control system 20/70/120 put in direct communication with the water heater temperature sensor(s) and heat source control (i.e. activation and deactivation control) in order to perform the functions described herein. The reference to communication between controller 20 and water heater 18 (and between control system 70 and water heater 68, and between control system 120 and water heater 138) encompass such communications between the control system and the water heater controller or, particularly where the water heater controller's functions are incorporated by the control system, between the control system and the water heater temperature sensor(s) and heat source(s).

Similarly, as described below, control systems 20 and 70 communicate with variable fan controllers 25 and 115, and the communications indicated between control systems 20 and 70 and outdoor and indoor units 14/64 and 16/66 reflect such communications. Still further, however, the functions of the variable fan controllers may also be incorporated entirely within the control system, so that the fan controllers may be omitted and the control system communicates directly with temperature sensors 27/117, or 42 or 46.

It will be understood from the present disclosure that the functions ascribed to control system 20/70/120 may be embodied by computer-executable instructions of a program that executes on one or more computers, for example embodied by a residential or commercial split system air conditioning system controller. Generally, program modules include routines, programs, components, data structures, etc., that perform particular tasks and/or implement particular abstract data types. Moreover, those skilled in the art will appreciate that the systems/methods described herein may be practiced with various controller configurations, including programmable logic controllers, simple logic circuits, single-processor or multi-processor systems, as well as personal computers, hand-held computing devices, microprocessor-based or programmable consumer or industrial electronics, and the like. Aspects of these functions may also be practiced in distributed computing environments, for example in so-called "smart home" arrangements and systems, where tasks are performed by remote processing devices that are linked through a local or wide area communications network to the components otherwise illustrated in the Figures. In a distributed computing environment, programming modules may be located in both local and remote memory storage devices. Thus, control system 20 may comprise a computing device that communicates with the system components described herein via hard wire or wireless local or remote networks.

A controller that could effect the functions described herein could include a processing unit, a system memory and a system bus. The system bus couples the system components including, but not limited to, system memory to the processing unit. The processing unit can be any of various available programmable devices, including microprocessors, and it is to be appreciated that dual microprocessors, multi-core and other multi processor architectures can be employed as the processing unit.

Software applications may act as an intermediary between users and/or other computers and the basic computer resources of electronic control system 20, as described, in suitable operating environments. Such software applications include one or both of system and application software. System software can include an operating system that acts to control and allocate resources of control system 20. Application software takes advantage of the management of resources by system software through the program models and data stored on system memory.

The controller may also, but does not necessarily, include one or more interface components that are communicatively coupled through the bus and facilitate interaction with the control system. By way of example, the interface component can be a port (e.g., serial, parallel, PCMCIA, USC, or FireWire) or an interface card, or the like. The interface component can receive input and provide output (wired or wirelessly). For instance input can be received from devices including but not limited to a pointing device such as a mouse, track ball, stylus, touch pad, key pad, touch screen display, keyboard, microphone, joy stick, gamepad, satellite dish, scanner, camera, or other component. Output can also be supplied by control system 20 to output devices via the interface component. Output devices can include displays (for example cathode ray tubes, liquid crystal display, light emitting diodes, or plasma) whether touch screen or otherwise, speakers, printers, and other components. In particular, by such means, control system 20 received inputs from, and directs outputs to, the various components with which control system 20 communicates, as described herein.

In general, the control system receives signals from the thermostat, the water heater, and possibly temperature sensors or other operating parameter sensors that are not part of the thermostat or water heater. The controller activates or deactivates the air conditioning system to provide or stop the provision of conditioned air to a conditioned space in response to the thermostat signals. It decides whether to activate a water heating source in response to the water heating signal, and it decides which water heating heat source to utilize in response to the water heater signals and the operating parameter signals (which may include the thermostat signal) and in some instances in response to the air conditioning mode in which the air conditioning system exists. The apparatus for carrying out these functions, and the manner of their operation, are described below.

Referring initially to FIG. 1, outdoor condensing unit 14 includes a condenser coil 22, an associated condenser fan 24, and a compressor 26. The condenser coil and compressor are coupled, as shown, by a refrigerant tubing circuit 28 and liquid refrigerant line portions 30 and 32, to indoor unit evaporator coil 34 and to a heat conductive refrigeration tube spiral-wrapped around a metal tank portion 36 of water heater 18 and serving as a refrigerant to tank water heater exchanger 38 for water heater 18. Although a single coil is illustrated, multiple parallel coils may be utilized to reduce pressure drop through the heat exchanger. Thus, it should be understood that reference to a heat exchanger "coil" encompasses one or multiple coils, in series or in parallel. It will also be understood that the coils may be covered in insulation.

Operatively linked to electronic control system 20 are (1) an electronically controlled regulator valve 40 with an associated refrigerant temperature sensor 42 installed as shown in refrigerant tubing circuit 28 within condensing unit 14, (2) an electronically controlled regulator valve 44 and an associated refrigerant temperature sensor 46 installed as shown in refrigerant tubing circuit 28 between line 32 and (adjacent to) a refrigerant inlet 48 of heat exchanger coil 38, and (3) a normally open solenoid valve 50 installed in a refrigerant bypass line 32a between heat exchanger inlet 48 and a heat exchanger refrigerant outlet 52. As illustrated in FIG. 1, water to be heated flows into water heater tank 36 via a water inlet pipe 54 and, in response to a heated water demand, is discharged from tank 36 via a hot water supply pipe 56.

FIGS. 1-7 illustrate temperature sensors 42, 46, 27, 102, and 117. As described below, temperature sensors 27 and 117 are utilized by fan controllers 25 and 115, respectively, in variably driving the outdoor and indoor coil fans. Each of temperature sensors 42, 46, and 102 illustrate other positions at which temperature sensors may be placed to provide temperature information to drive control of the outdoor fan, in place of temperature sensor 27. These sensors should, therefore, be understood as alternatives to sensor 27 and may be omitted in the presence of sensor 27.

Further, the Figures illustrate various electronically controlled valves as normally open or normally closed valves, whereas other valves are illustrated as electronically controlled proportional valves. As will be understood, the normally open or normally closed valves transition between open or closed states, whereas the proportional valves can be used to meter fluid flow if desired. In the examples discussed herein, all the electronically controlled valves transition between fully open and fully closed states, and it is thus encompassed within the present disclosure that all valves may be non-proportional valves. It should also be understood, however, that the use of proportional valves to meter fluid flow, for example via the condenser bypass valves, is encompassed within the scope of the present disclosure.

An expansion valve 58 is disposed in line 32 at an inlet to indoor coil 34. As should be understood, an expansion valve receives a fluid input at a high pressure and, depending on the settings within the valve, outputs the fluid at a lower pressure. This allows pressurized refrigerant entering coil 34 (when used as an evaporator) to drop in pressure in the evaporator coil and change phase from a liquid to a gas.

Under the conditions illustrated in FIG. 1, control system 20 receives a signal from controller or a temperature sensor in water heater 18 indicating that the tank's water temperature is above the water heater's low set point, which is stored in the control system's memory. That is, no water heating is called for. Assume, also, that control system 20 has received a signal from the building's thermostat (not shown) requiring the air conditioning system to provide cool air to the conditioned space. With air conditioning system 12 accordingly in an air cooling-only mode, without need for the control system to also select and actuate a water heating heat source (e.g. the water heater's heat source or refrigerant heat transferred to the water in tank 36 via heat exchanger 38), gaseous refrigerant flows from evaporator coil 34 to compressor 26 via suction line 30. Compressor 26 pumps the gaseous refrigerant forward, increasing the refrigerant's pressure and temperature and causing the now-hotter refrigerant gas to flow through condenser coil 22. Control system 20 actuates fan 24 (at a constant speed) via a variable fan speed control 25 to thereby push or draw air over the condenser coils, causing the gaseous refrigerant to cool in coil 22 and thereby change phase from a gas to a liquid. This draws heat energy from the refrigerant into the moving air, thereby dissipating heat from the refrigerant (and, therefore, from the conditioned space) into the ambient environment. Still under the pressure provided by compressor 26, the now-liquid refrigerant flows from the output of condenser 22 to the split between the input line to heat exchanger 38 and the bypass line including valve 50. Control system 20 maintains valve 40, between the condenser and the compressor, closed. Since no water heating is called for, control system 20 maintains valve 44 closed and valve 50 in its normally fully open position. This blocks refrigerant flow to the heat exchanger coil, and liquid refrigerant exiting condenser coil 22 therefore flows through open solenoid valve 50, bypassing water heater heat exchanger 38, to expansion valve 58. Expansion valve 58 drops the pressure of the liquid refrigerant as it enters evaporator coil 34. Within the evaporator, the refrigerant transitions to gaseous phase, drawing heat energy from air flowing over coil 34, which is disposed in the air flow path generated by an air handler fan (the air flow path is illustrated schematically in FIG. 1 by the relationship of coil 34 and the illustrated fan). This cools the indoor air being re-circulated by the air handler, thereby cooling the conditioned indoor space. The now-warmer gaseous refrigerant discharged from evaporator coil 34 then returns to compressor 26 via suction line 30, and the cycle repeats.

As noted, control system 20 controls the operation of heat exchanger 38 in response to receipt of temperature information from a water heater controller or from a temperature sensor at tank 36. As should be understood, water heater 18 typically operates between low and high temperature set points. In the presently-described embodiments, control system 20, rather than the water heater's independent control, responds to water heater water temperature when it falls below the water heater's low set point, selecting between the water heater's inherent heat source and heat exchanger 38 as the means by which to add heat to the water heater, depending upon which heat source results in higher overall system efficiency. The basis for this decision is discussed in more detail below.

Turning now to FIG. 2, when water heater 18 requires refrigerant heat (as determined by comparison of the value of a temperature signal from the non-illustrated temperature sensor in a bottom portion of tank 36 to the stored water tank low set point), control system 20 (FIG. 1) appropriately positions the various previously described valves 40, 44, and 50 to which it is linked to cause the refrigerant traversing tubing circuit 28 from the outdoor unit to pass through heat exchanger 38, thereby adding refrigerant heat to water in tank 36, before flowing to evaporator coil 34. When control system 20 detects that heating responsibility should shift from the heat exchanger to the water heater heat source, or that water heater 18 no longer needs refrigerant heat, as described below, it returns air conditioning system 12 to its air cooling-only mode, as discussed with regard to FIG. 1, in which all of the refrigerant flow traversing tubing circuit 28 bypasses water heater coiled tube heat exchanger 38.

More specifically, when the control system receives a signal from the temperature sensor indicating water heating is needed, when air conditioning system 12 is otherwise in an operative mode to provide conditioned air to a conditioned space, and when the control system initially actuates water heating by heat exchanger 38 rather than the water heater's inherent heat source, control system 20 switches fan speed controller 25 from full speed (at which fan 24 is operated during air cooling-only mode) to a variable speed mode (in which fan speed controller 25 controls the speed of fan 24 in response to a temperature sensor 27, as described below), opens valve 44, closes valve 50, and opens valve 40. By opening valve 44 and closing valve 50, the control system directs the entirety of the refrigerant flow through heat exchanger 38. The condenser coil, however, receives only part of the refrigerant flow output from compressor 26. By opening valve 40 and allowing some of the refrigerant flow to bypass the condenser, the refrigerant flowing from condenser 22 and valve 40 to heat exchanger 28 contains both cooler liquid and warmer gaseous refrigerant. That is, the refrigerant flow includes hot gaseous refrigerant that, but for bypass valve 40, would have cooled and condensed in coil 22 but is instead diverted to coil 38, which in turn cools the refrigerant, condenses the gaseous refrigerant component of the dual phase refrigerant flow that reaches the heat exchanger, and transfers the removed heat to water within water heater tank 36. Accordingly, heat exchanger 38 may be considered a sub-condenser or sub-cooler of the overall condenser, as it completes the condensing function begun by condenser coil 22.

Valve 40, therefore, effectively diverts heat from the compressor output to the heat exchanger that the condenser would otherwise have removed. The amount of heat that the valve diverts is defined by the balance of refrigerant flow between valve 40 and coil 22. This balance is, in turn, defined by the speed of fan 24. The bypass refrigerant flowing through valve 40 is warmer than the condensed refrigerant flowing through condenser coil 22. As should be understood, the cooler, condensed refrigerant presents less resistance to flow through the condenser coil than does the hot gaseous refrigerant through bypass valve 40, even though the bypass valve path is much shorter in length. Thus, if valve 40 is opened to its fully open state when condenser 22 is operating at its full capacity, most of the refrigerant from compressor 26 will flow through the condenser rather than the bypass valve, thereby delivering a relatively low amount of additional, diverted heat to the heat exchanger. To increase the refrigerant flow balance toward bypass valve 40, variable fan controller 25 reduces the speed of fan 24 when water heating is needed. This reduces the rate at which air flows over the condenser coils, thereby reducing the rate at which refrigerant in the condenser coil cools and correspondingly increasing the resistance to refrigerant flow. This, in turn, increases refrigerant flow through the bypass valve and increases the heat contributed to the heat exchanger.

At system set up, control system 50 downloads a target temperature to fan controller 25. When, in system operation, controller 25 receives a signal from controller 20 indicating that water heating mode has begun, fan controller 25 ceases full speed fan operation and compares the output of temperature sensor 27 to the target temperature. If the sensor 27 temperature is above the target temperature, controller 25 increases the speed of fan 24, which thereby draws air over (and cools) the refrigerant in the coil at a higher rate, and reduces the amount of hot bypass refrigerant flowing through valve 40. If the sensor 27 temperature is below the target temperature, controller 25 decreases the speed of fan 24, thereby reducing the heat removed from the refrigerant, and increasing its flow resistance, to thereby allow more hot gaseous refrigerant to bypass the condenser coil. Thus, the target temperature represents the temperature at which the condenser/bypass combination provides refrigerant to the heat exchanger. The target temperature preferably does not exceed the temperature at which compressor 26 outputs gaseous refrigerant or drop below the temperature of water in tank 36.

Selection of the target temperature may depend on the configuration of system 12. Heat exchanger 38 cools refrigerant flowing through its coil (toward a lowest temperature equal to the temperature of water in the water heater tank) but removes heat from the refrigerant at a rate slower than the condenser's heat removal rate. Moreover, the heat exchanger's heat transfer capacity declines as the water heater's water temperature rises and approaches the refrigerant temperature. If the target temperature for refrigerant exiting outdoor unit 14 is too high, the residual heat retained within the refrigerant flow path (due to the heat exchanger's failure to remove the heat) increases flow path pressure and, therefore, the work done by compressor 26, for no offsetting heat transfer gain at the water heater or the conditioned air, thereby reducing system efficiency. On the other hand, setting the target temperature tool low reduces the heat exchanger's ability to transfer heat to the water heater tank. One way of selecting a target temperature within these boundaries is to operate the system in a pre-installation calibration process, testing the system's efficiency and heat transfer for various target temperatures within the possible temperature range and selecting the target temperature that balances these considerations to the user's preference. In one embodiment, the target temperature is set to the highest temperature from which heat exchanger 38 can successfully bring refrigerant to the tank water temperature at any point in the tank's water temperature range between the water heater's low and high set points. Since the heat exchanger's heat transfer capacity is lower at other tank water temperatures, selection of this target results in some residual heat remaining in the refrigerant flow path as the tank's water temperature moves from this maximum point, but this cost may be acceptable in order to allow the heat exchanger its maximum heat transfer capacity. In a further embodiment, control system 20 downloads a range of temperature targets corresponding to changing water heater temperatures determined at calibration, and controller 25 continuously updates the target temperature in response to temperature data from the control system as water heater water temperature changes. In a still further embodiment, the control system initially downloads a target temperature equal to a predetermined temperature increment above the present tank water temperature. As tank water temperature rises, the control system increases the target temperature, up to the maximum target temperature. The predetermined increment is selected at system configuration and can be set as desired.

When the control system receives a signal from the water heater temperature sensor (either directly or through the water heater controller) indicating a need for water heating, control system 20 first determines the air conditioning mode (i.e. providing conditioned air to the conditioned space, or not providing conditioned air to the conditioned space, and if providing conditioned air in embodiments where the system both heats and cools, whether in air-heating or air-cooling configuration) in which the air conditioning system presently exists. As described below, control system 20 may have calibrated data sets for some or all of its air conditioning operation modes that represent a comparison of system efficiency when relying on the refrigerant heat exchanger or, alternatively, on the water heater's inherent heat source. If the control system has no data sets for its present air conditioning mode, it activates the water heater heat source and relies on that heat source to fully heat the water, without utilization of the heat exchanger. If it does have data sets for the present air conditioning mode, the control system identifies (1) ambient air temperature as detected from a temperature sensor at outdoor unit 14 that communicates with the control system, (2) indoor air temperature as detected by the indoor thermostat, and (3) water tank temperature as detected by the tank temperature sensor. The control system applies this input data to the air-conditioning-mode-dependent data sets which, given the specific operating parameter values represented by the input data, provide a ratio value representing a comparison of system efficiency (at these parameter values) when relying on the refrigerant heat exchanger and, alternatively, when relying on the water heater's inherent heat source. Based on this comparison, control system 20 selects between the two heating options, sets the system valves accordingly, and provides corresponding control signals to the water heater. Water heating continues, utilizing the selected heat source, but the control system repeatedly monitors these three input variables and correspondingly re-assesses the efficiency comparison based on the data sets. If the choice of heat source resulting from these changing variables changes from the then-currently active heat source to the other, and if that condition persists uninterrupted for some predetermined period of time, e.g. one minute, then the control system deactivates the presently active heat source and activates the other heat source. The control system continues to monitor the variables, and continues to monitor for a change in chosen heat source that persists for the predetermined time period, and changes the heat source if that condition occurs. In this manner, the choice of heat source can change multiple times, as conditions change, before the water heater reaches its high set point. When the control system detects that the water heater has reached the high set point, the control system deactivates the then-active heat source and does not reactivate either heat source until receiving a water temperature signal indicating the tank's water temperature has dropped below the water heater's low set point, at which point the cycle repeats. In a further embodiment, the control system always assumes that use of the refrigerant heat exchanger is more efficient at low water heater temperatures, and so always initially utilizes the heat exchanger.

The data set represents a comparison of system efficiency between two conditions: (1) air conditioning system and water heater operation when the refrigerant heat exchanger is active and the water heater heat source is inactive, and (2) air conditioning system and water heater operation when the refrigerant heat exchanger is inactive and the water heater heat source is active. For each condition, overall system efficiency may be defined as the system's coefficient of performance, or COP. The COP may be described as the ratio of heating or cooling energy (BTU/hr or Watts) provided to the conditioned air plus heating energy (BTU/hr or Watts) moved into the water heater water, divided by energy (BTU/hr or Watts) consumed by the air conditioning system and water heater in providing such energy to the conditioned air and the water heater water.

As should be understood in this art, the energy input to the water and conditioned air, and energy consumed, may depend on the electrical and mechanical configuration of the air conditioning and water heating system. For a given system, however, this consideration is a constant and can be accommodated in the calibration process as described herein. Relevant parameters that can vary, however, are:

Selected water heat source, i.e. the refrigerant heat exchanger or the water heater's inherent heat source;
Air conditioning mode, i.e. (1) air cooling, (2) air heating, or (3) inactive (neither air cooling nor air heating);
Outdoor ambient temperature;
Water tank water temperature; and
Indoor temperature.

To calibrate the system, the air conditioning and water heating system (e.g. as illustrated in FIGS. 1-3, FIGS. 4-7, or FIGS. 8-13) is constructed and installed in conditions under which the defining variables can be controlled. The outdoor unit is operatively installed at a location at which it is possible to both operate the outdoor unit and vary the ambient temperature. The indoor unit is installed at a location separate from the outdoor unit at which it is possible to vary the indoor (conditioned space) ambient temperature. The water heater is disposed at a location at which the water heater water temperature can be controlled independently of the outdoor unit and indoor unit ambient temperatures.

Each system is then calibrated for each possible combination of the first two variables. Consider, first, the system described with respect to FIGS. 1-3. As is apparent from the discussion herein, the system does not have an air heating mode, and in its inactive mode the system valves are not configurable to permit use of the refrigerant heat exchanger. Thus, this system can operate selectively between the refrigerant heat exchanger and the water heater heat source only in its air cooling mode. Accordingly, a data set will exist only for the air-cooling mode, and the system would need efficiency calibration only under the following two conditions:

Air cooling space conditioning and operation of refrigerant heat exchanger; and

Air cooling space conditioning and operation of water heater heat source.

Each of the systems described with respect to FIGS. 4-7 and FIGS. 8-13 can operate selectively between the refrigerant heat exchanger and the water heater heat source in any of its three air conditioning modes, and thus can be calibrated under the following six conditions:

Air cooling space conditioning and operation of refrigerant heat exchanger;

Air cooling space conditioning and operation of water heater heat source;

Air heating space conditioning and operation of refrigerant heat exchanger;

Air heating space conditioning and operation of water heater heat source;

Inactive air conditioning and operation of refrigerant heat exchanger; and

Inactive air conditioning and operation of water heater heat source.

Assume, then, that a given system is assembled in such a calibration environment, and operated sequentially in each of its possible conditions as noted above. In each condition, two of the five COP-relevant variables are fixed, and the remaining three variables (outdoor ambient temperature, water tank temperature, and indoor (conditioned space) temperature) can be controlled in the calibration environment. In particular, each variable can be varied over a respective range of values that would be reasonably expected to occur in the system's use. Given the three variables, and given the respective expected ranges for each, the system is operated in the calibration environment while varying the three variables and measuring or estimating the components of the system's COP. That is, for combinations of the three variables over their assumed operative ranges, the system determines and records system COP. For a given system, the resulting data set is stored or otherwise accessible to control system 20/70/120. Accordingly, after completing the calibration process for each of the dual variable (selected water heater heat source/air conditioning mode) configurations for a given system, the control system has, for each configuration, a COP data set from which COP can be defined with knowledge of the values for the three defining variables (outdoor ambient air, water tank water temperature, and indoor temperature).

In a given system's operation, the control system always knows the system's air conditioning mode, and it receives values for the three defining variables from corresponding sensors. As noted, a temperature sensor at the outdoor unit provides outdoor ambient temperature. The system thermostat provides indoor temperature, and the water heater temperature sensor provides water temperature. Assume, then, that the system is operating in one of the three air conditioning modes, and the control system receives a signal from the water heater temperature system indicating a need for water heating. With calibration complete, the control system has a data set for each of the possible operating conditions, corresponding to selected water heater heat source and air conditioning mode. If the system is operating in one of the air conditioning modes for which a COP data set exists (e.g. any of the three air conditioning modes for the systems of FIGS. 4-7 and 8-13, but only air cooling mode for the system of FIGS. 1 and 2), the control system retrieves the two data sets (one for refrigerant heat exchanger, and one for water heater water source) corresponding to that air conditioning mode, detects the actual defining variable values from the corresponding sensor inputs, and determines the COP value defined by the three variables for each of the two data sets. If the ratio of the COP for the system utilizing the refrigerant heat exchanger to the COP for the system utilizing the water heater heat source is equal to or greater than 1.0, the control system activates the refrigerant heat exchanger (i.e. with regard to the embodiment of FIG. 1, opens valve 44, closes valve 50, opens valve 40, and instructs controller 25 to control fan 24 speed to maintain the target refrigerant level) and deactivates the water heater heat source, else if the ratio is less than 1.0, the control system deactivates the refrigerant heat exchanger and activates the water heater heat source. The control system continuously monitors the three defining variables. As long as the water heater water temperature is below the water heater's high set point, the control system repeatedly (e.g. every ten seconds) measures the three variables and recalculates the ratio. If the ratio changes state (i.e. moves across the 1.0 threshold, thereby indicating a change in water heater heat source from the presently activated source) and persists in the changed state for more than a predetermined period of time, e.g. one minute, the control system deactivates the presently active water heater heat source and activates the other water heater heat source. The control system thereafter continues to repeatedly read the defining variable values, re-determine the ratio, and change the water heat source if so indicated by a persistent ratio. This process continues until the water heater temperature reaches the high set point, at which point the control system deactivates both water heater heat sources, and takes no further water heating action until the water temperature signal indicates that the water heater water temperature has again fallen to or below the water heater's low set point, at which point the cycle repeats.

In a further embodiment, the control system selects the water heater heat source based on the system COP comparison as described above, but with the additional qualification that even if the COP comparison continues to favor selection of refrigerant heat exchanger, if that selection persists continuously for at least a predetermined period of time, e.g. thirty minutes, the control system will activate the water heater heat source and deactivate the refrigerant heat exchanger and thereafter allow the water heater heat source to heat the water heater water up to the water heater's high set point, without consideration of comparative system efficiency. Since the refrigerant heat exchanger is typically unable to bring the water heater to its final high set point alone, this modification to the process protects against system dedication to the refrigerant heat exchanger under conditions in which the heat exchanger cannot bring the water to the final set point.

It should be understood that variations in the heat source selection process are encompassed by the present disclosure. For example, it should be understood in view of the present disclosure that use of the refrigerant heat exchanger tends to be more efficient than use of the water heater heat source when the water heater water temperature is low. At the lower temperatures, the water heater draws more heat from the refrigerant flowing through the heat exchanger than at higher temperatures, thereby lessening the resistance that the heat exchanger coil provides to refrigerant flow and reducing system pressure. As the water heater water temperature is always at the water heater low set point when the control system initiates water heating, in one embodiment the control system defaults to operation of the refrigerant heat exchanger at cycle initiation, without reference to the COP comparison (assuming data sets exist for the existing air-conditioning mode). Thereafter, the control system continuously monitors the COP comparison, as described above, and switches to the water heater heat source when the ratio drops below 1.0 and persists below that level for at least the predetermined period of time. Also, recognizing the likelihood that, once the COP comparison transitions the heat source to the water heater heat source, subsequent COP comparison would likely continue to select the water heater heat source, then once the control system switches to the water heater heat source, the control system no longer examines COP, instead maintaining activation of the water heater heat source through the end of water heating. In this embodiment, the control system may continue to monitor water heater temperature following the switch to the water heater heat source or, alternatively, relinquish control of the water heater heating cycle to the water heater controller to complete the cycle, as discussed above.

It will be understood in view of the present disclosure that various methodologies may be used to determine the components of the COP calculations during system calibration. To determine energy actually moved into the water heater water, control system 20 may store water temperature values received from the water heater's temperature sensor over a predetermined period of time, thereby determining actual change in water temperature. Since the control system also knows the volume of water in the water heater, the control system can determine the corresponding BTU/hr and convert that number to Watts.

As should be understood in this art, precise determination of actual energy moved into or out of the conditioned air involves a determination of enthalpy change over the predetermined time period. While methods of making such measurements are known, they may also be unavailable or impractical. However, since the control system can determine whether the air handler fan has been active over the predetermined period of time, and since the control system knows the air handler's capacity, the control system can estimate the volume of air that the air handler has moved into the conditioned space. The control system also measures the conditioned space temperature from the thermostat signals, and based on the temperature change in the conditioned space and the estimated volume of air moved into the conditioned space within the predetermined period of time, the control system can estimate BTU/hr over that period, within an approximately 10% accuracy. Again, the control system can convert this number to Watts.

In some instances, of course, certain components of the COP calculation do not exist. For example, where the air conditioning mode is inactive, there is no energy moved into or out of the conditioned space.

The denominator of the COP calculation is the energy consumed by the system in contributing the energy represented by the numerator. This, in turn, is the energy used by the compressor, the coil fans, and the water heater over the predetermined time. Compressor power utilization may be directly measured in calibration by a watt meter or by continuously measuring compressor suction pressure, discharge pressure and suction gas temperature, in view of the compressor's performance curves. Fan power can be measured by a watt meter but can be estimates or assumed based on lab testing.

Figure 3:
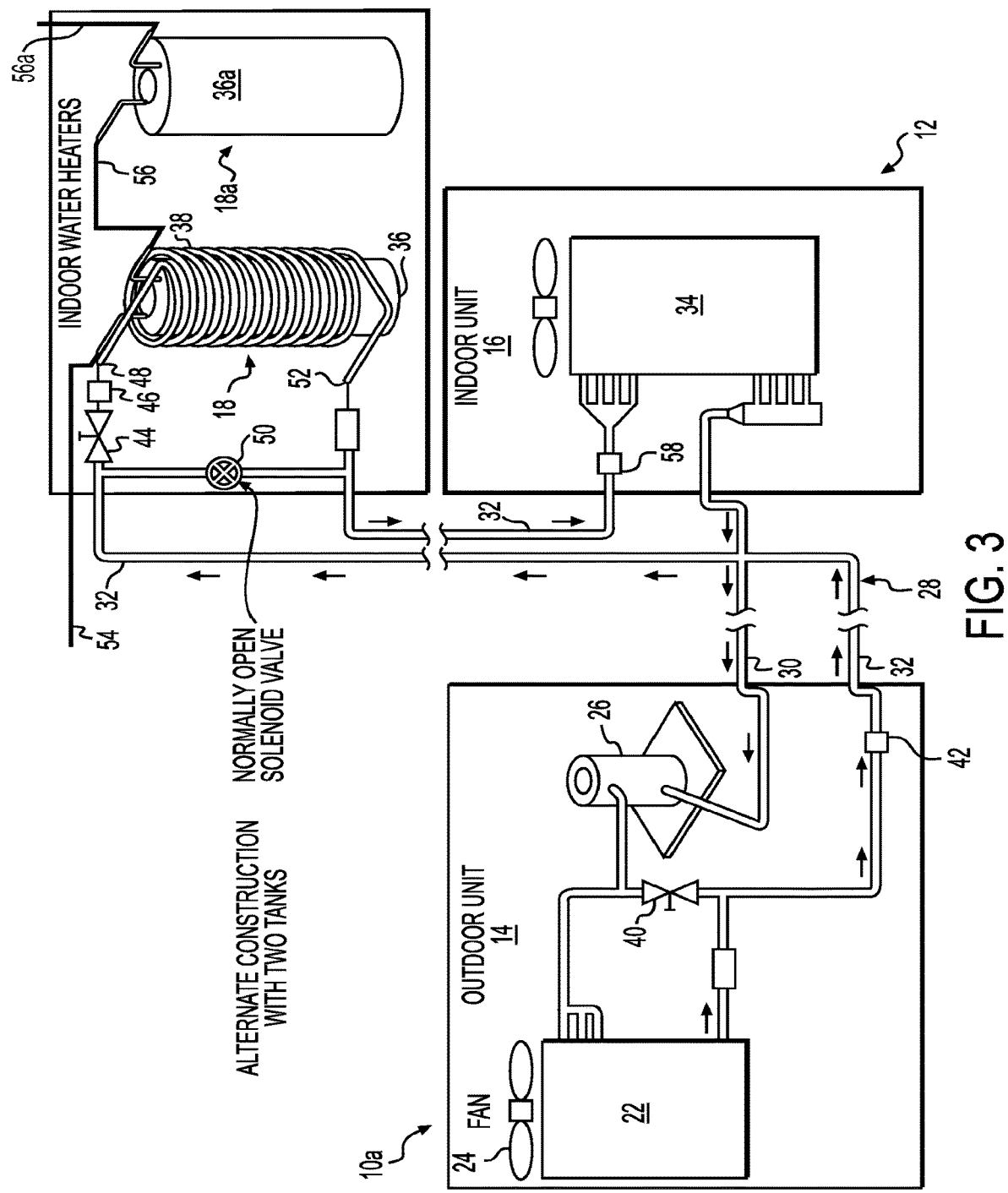
FIG. 3 is a schematic diagram of the system as in FIG. 2, but with the air conditioning system providing refrigerant heat to one of two water heater tanks in a two water heater tank arrangement.

The overall air conditioner/water heater circuit 10a schematically illustrated in FIG. 3 is identical to the system 10 described above with respect to FIGS. 1 and 2, with the exceptions that (1) an additional water heater 18a, having either electric or gas heating apparatus associated therewith, but without an associated coiled tube refrigerant-to-water heat exchanger, is connected in series with the previously-described water heater 18 such that water exiting water heater 18 via pipe 56 flows through the additional water heater 18a and is then discharged therefrom through a hot water outlet pipe 56a, and (2) water heater 18 is not provided with electric or gas heat, but receives only refrigerant heat via its tubing heat exchanger portion 38, thus functioning solely as a water pre-heating device. Water heater 18a may correspond in capacity to water heater 18 as shown in FIGS. 1 and 2, which is for example a forty to fifty gallon electric or gas water heater. The water heater 18 of FIG. 3 may be of a larger, smaller, or similar capacity.

The configuration shown in FIG. 3 emphasizes the advantages of the refrigerant flow heat exchanger when water tank water temperature is low. The two tank configuration allows hot water to be stored when the air conditioning system 12 is running (in cooling or heating modes) during times when there is little or no demand for hot water, thereby providing additional low cost hot water capacity during periods of time when the demand for hot water is high. It also improves the efficiency of the air conditioning system compared to the single tank arrangement described above with respect to FIGS. 1 and 2, since water in pre-heating tank 18 (FIG. 3) will usually be at a lower temperature than water in the main tank during periods of time when there is little demand for hot water.

The system does not use a comparison of efficiencies to control when to actuate and de-actuate the water heating heat exchanger 38 shown in FIG. 3. Since the refrigerant heat exchanger is not proximate the same water heater that is heated by the water heater heat source, the efficiency comparison described above with respect to FIGS. 1 and 2 (and below with respect to FIGS. 4-7 and 8-13), is not applicable. Rather, water heater 18a heats under its independent heat source, and the air conditioning system activates the refrigerant heat exchanger up to a predetermined set point temperature of the pre-heated tank 18. The set point is set to a level below the temperature of the compressor output temperature, but it is otherwise selectable by the operator. A pre-heating tank may also be used with the air conditioning systems described below with respect to FIGS. 4-7 and 8-13.

Figure 4:
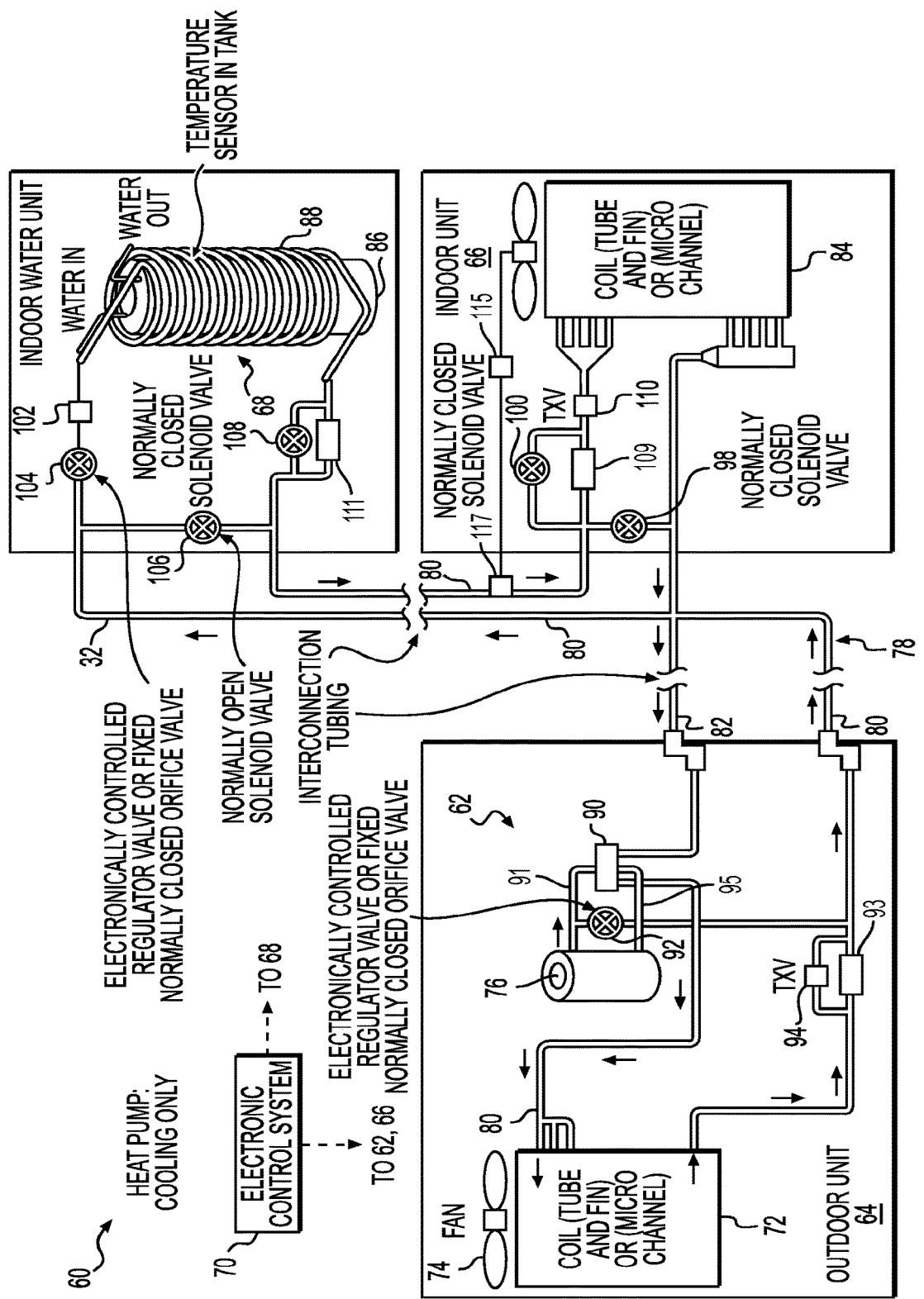
FIG. 4 is a schematic diagram of a an air conditioning system according to an embodiment of the present invention, with an air conditioning system providing only conditioned space air cooling.
Figure 5:
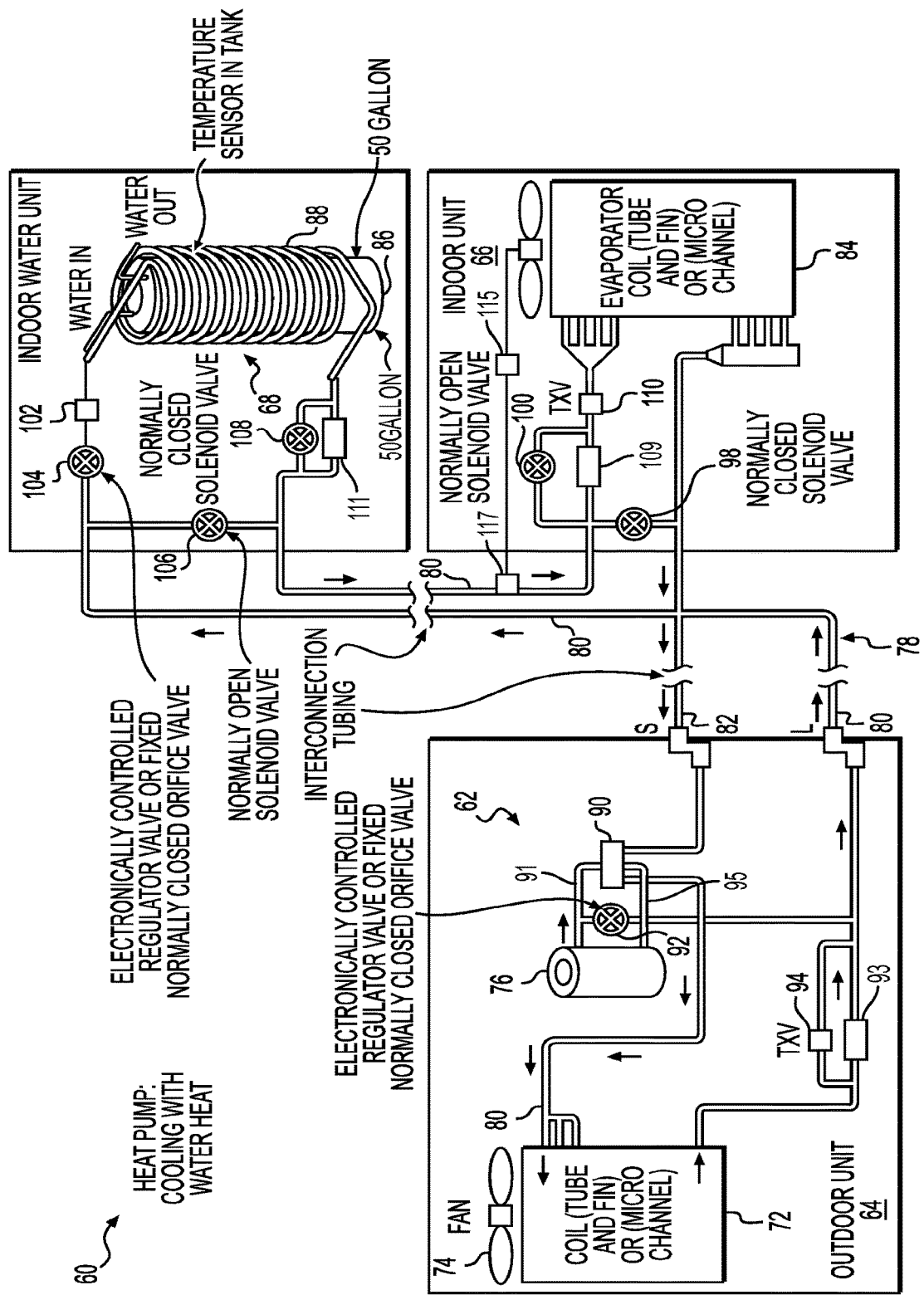
FIG. 5 is a schematic diagram of the system as in FIG. 4, but with the air conditioning system providing conditioned space air and providing refrigerant heat to a water heater.
Figure 6:
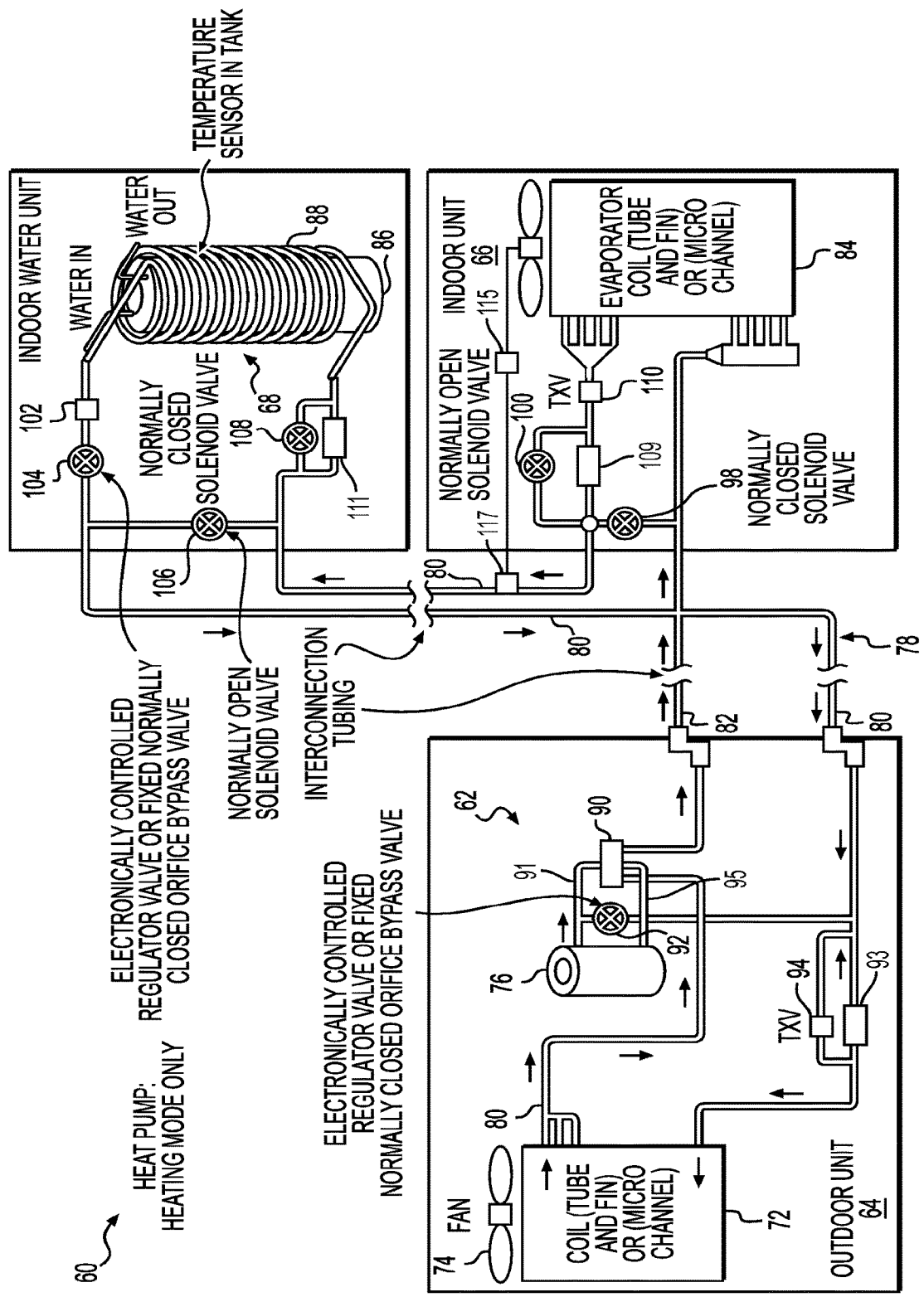
FIG. 6 is a schematic diagram of the system as in FIG. 4, but with the air conditioning system providing conditioned space air heating without providing refrigerant heat to a water heater.
Figure 7:
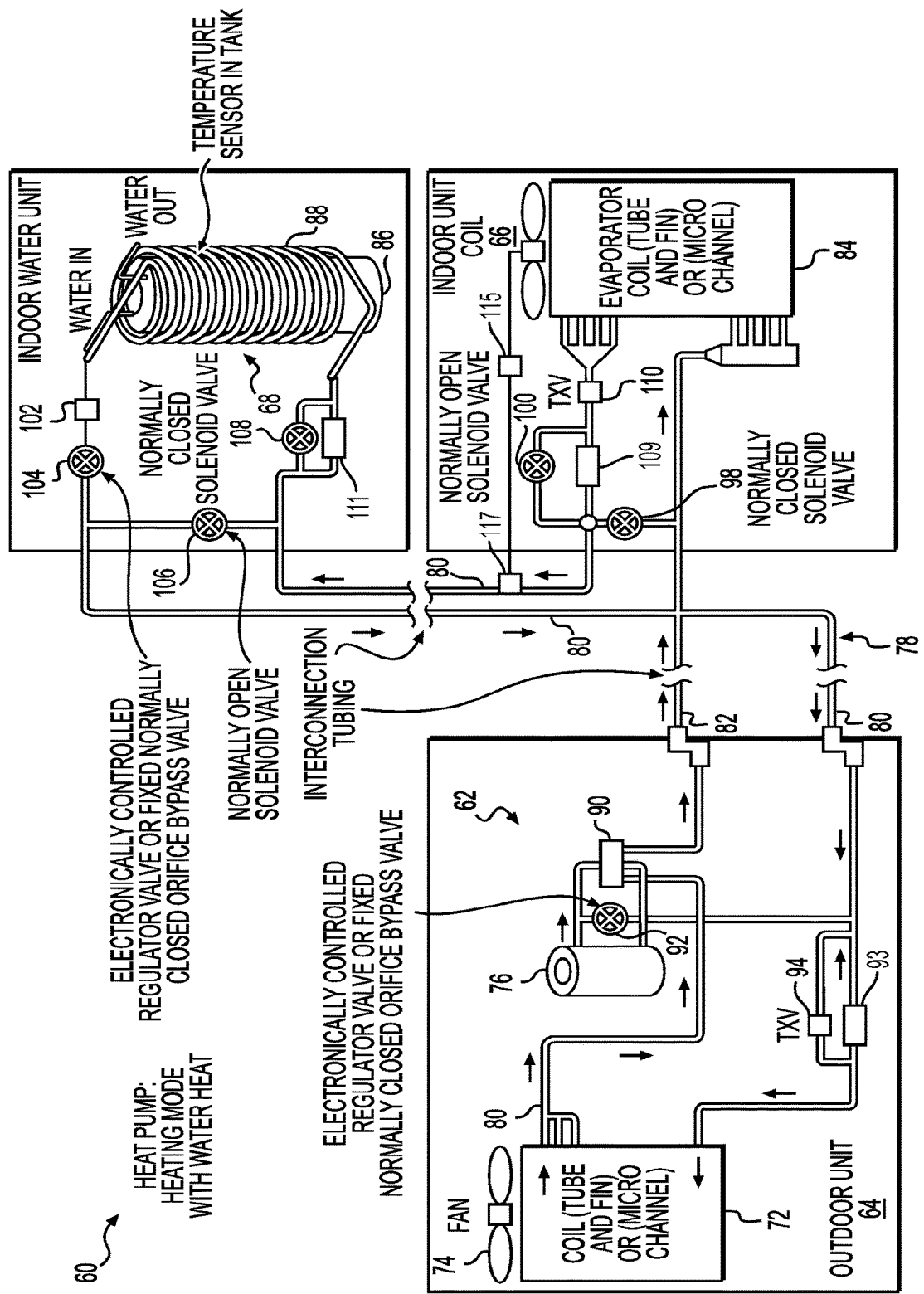
FIG. 7 is a schematic diagram of the system as in FIG. 4, but with the air conditioning system providing conditioned space air and providing refrigerant heat to a water heater.

An air conditioning system 60 embodying one or more principles of the present invention is schematically depicted in FIGS. 4-7 and includes (1) a heat pump 62 having an outdoor coil unit 64 and an indoor coil unit 66, and (2) an associated water heater 68 which, representatively, may be a gas-fired or electric water heater. In FIG. 4, heat pump 62 is in an air cooling-only mode. In FIG. 5, heat pump 62 is in an air cooling mode and further provides supplemental, refrigerant-based water pre-heating to water heater 68. In FIG. 6, heat pump 62 is in an air heating-only mode. In FIG. 7, heat pump 62 is in an air heating mode and further provides supplemental, refrigerant-based water pre-heating to water heater 68. The various functions of air conditioning system 60 are controlled by a schematically depicted electronic control circuit 70 (shown only in FIG. 4) which operates various subsequently described components of system 60.

As shown in FIGS. 4-7, outdoor coil unit 64 includes a coil 72 and associated fan 74, and a compressor 76. Coil 72 and compressor 76 are coupled, as shown, by a refrigerant tubing circuit 78 having line portions 80 and 82, to indoor unit coil 84 and to a heat conductive copper tube that is spiral-wrapped around a metal tank portion 86 of water heater 68 and serves as a refrigerant-to-tank water heat exchanger 88 for water heater 68.

Outdoor unit 64 has a reversing valve 90, an electronically controlled regulator valve 92, an expansion valve 94, and a check valve 93 (which can be considered as the expansion valve's inherent check valve) connected as shown in tubing circuit 78 and operatively linked to electronic control system 70. Indoor coil unit 66 has a normally closed solenoid valve 98 and a normally closed solenoid valve 100 connected across a check valve 109 as shown in tubing circuit 78 and operatively linked to electronic control system 70. The indoor unit also has an expansion valve 110, and the valve 100/109/110 assembly can be replaced by a parallel expansion/check valve as indicated at 93/94. Water heater 68 has a temperature sensor 102, an electronically controlled regulator valve or normally closed solenoid valve 104, a normally open solenoid valve 106, and a normally closed solenoid valve 108 connected as shown in tubing circuit 78 and operatively linked to electronic control system 70.

Turning now to FIG. 4, with air conditioning system 60 in an air cooling-only mode, electronic control system 70 sets the previously described valve components in tubing circuit 78 in a manner such that compressor 76 causes refrigerant discharged therefrom to flow, via tubing portion 80 of tubing circuit 78, sequentially through condenser coil 72 to water heater 68, evaporator coil 84, and back to the compressor. More specifically, as hot gaseous refrigerant flows out from compressor 76 on an output line 91, control system 70 maintains solenoid valve 92 closed, so that all of the compressor's output refrigerant flows to reversing valve 90. Control system 70 sets reversing value 90 to direct the gaseous refrigerant flow from line 91 to tubing portion 80 and thereby to condenser coil 72. Since none of the refrigerant bypasses the condenser coil through valve 92 in this mode, all of the hot refrigerant from the compressor condenses in coil 72 and flows therefrom via check valve 93 out of this outdoor unit and to the indoor water heater.

At the water heater, control system 70 maintains solenoid valve 104 closed and solenoid valve 106 open, and the refrigerant bypasses heat exchanger 88 through open solenoid valve 106. The liquid refrigerant then flows through tubing portion 80, through check valve 109 and expansion valve 110 (the control system maintains solenoid valves 100, 98, and 108 closed, and a check valve 111 blocks flow from left to right in the perspective of FIG. 4) and into evaporator coil 84. As discussed above, the expansion valve lowers pressure of the liquid refrigerant, allowing the refrigerant to change phase from liquid to gas in the evaporator coil and draw required heat energy from air flowing over coil 84 due to the air handler fan, to thereby cool air in the conditioned space. Also as discussed above, positive and negative pressure contributed by compressor 76 in the refrigerant tubing line is sufficient so that the now-gaseous refrigerant flows back to compressor 76 over tubing line 82 through reversing valve 90, which fluidly connects input tubing line 82 to a compressor input tubing line 95.

Referring to FIG. 5, when a temperature sensor (not shown) of water heater 68 sends an output signal to electronic control system 70 indicating that the water temperature of water in tank 68 has reached or fallen below the water heater's low set point temperature (as stored in memory at electronic control system 70), and if the COP comparison favors the refrigerant heat exchanger, the control system repositions water heater regulator valve 104 and normally open solenoid valve 106 such that the refrigerant flows through heat exchanger 88 and back into tubing portion 80, thereby adding refrigerant heat to the tank water, to expansion valve 110. The settings of valves 104, 106, and 92 are the same as those for valves 44, 50, and 40, as discussed above with respect to FIG. 2. In addition, valves 108 and 100 remain closed, as refrigerant flows through their respective opposing check valves, and valve 98 remains closed. Refrigerant flowing through coil 84 changes phase to a gas, as discussed above with respect to FIG. 4, and gaseous refrigerant returns to compressor 76 via tubing 82 and 95.

Although not shown in FIG. 5, fan 74 is controlled by a variable fan speed controller (see FIG. 2) that is, in turn, responsive to a pre-programmed target temperature in water-heating mode to control the speed of fan 74 so that the refrigerant flowing from coil 72 and bypass valve 92 maintain the desired target temperature in tubing 80, as described above with regard to the embodiment of FIGS. 1 and 2. The target temperature maybe selected as discussed above.

Similarly to operation of the embodiment discussed above with regard to FIGS. 1 and 2, control system 70 may select the water heating source based on the COP comparison (data sets exist for the air conditioning modes of this embodiment) or may default to selection of the refrigerant heat exchanger to heat the water heater when the control system receives a temperature signal from the water heater indicating a need to heat water. Regardless of the method or of the heat source chosen, the control system thereafter continuously re-assesses the COP comparison and selects between the two alternative water heating sources based thereon, as described above.

It should be understood that the control system may change the system's operation modes between air cooling of the conditioned space and air heating of the conditioned space (or actuation from one mode to the other from start up), or to the inactive mode, based on operator control of the system or automatically. When the control system enters an air heating mode, and referring now FIG. 6, the control system changes reversing valve 90 so that the refrigerant flowing from the compressor through tubing 91 flows through valve 90 to tubing 82 that connects to indoor coil 84. Valve 98 remains closed. Coil 84, receiving the hot gaseous refrigerant from compressor 76, now acts as condenser, cooling the refrigerant so that it changes phase back to a liquid. Exiting coil 84, the liquid refrigerant bypasses expansion valve 110 through its internal check valve and flows through now-open solenoid valve 100 around check valve 109. Control system 70 maintains valve 106 open and valves 104 and 108 closed. Since check valve 111 and closed valve 108 otherwise block the refrigerant's flow into heat exchanger 88, refrigerant from coil 84 flows through valve 106 and through tubing 80 to outdoor unit 64. The control system maintains valve 92 closed. Thus, all refrigerant from the indoor unit flows through expansion valve 94 and into outdoor coil 72. Expansion valve 94 (which is bypassed by its internal check valve 93 when the system operates in air cooling modes) lowers the refrigerant's pressure, causing coil 72 to act as an evaporator that draws heat from air passing over the coil as a result of operation of fan 74. The now-warmer refrigerant flows from coil 72 to expansion valve 90, which directs the refrigerant flow to the compressor's input tubing line 95.

Referring now to FIG. 7, if the electronic control system 70 receives a signal from the temperature sensor at water tank 86 indicating that the tank's water temperature has reached or fallen below the water heater's low set point while system 60 is operating in an air heating mode, control system 70 decides whether to activate the heat exchanger or the water heater heat source, e.g., based on the data sets/COP comparison as described above, or by default to the heat exchanger followed by the data sets/COP comparison. Assuming the control system initially activates the heat exchanger, the control system appropriately adjusts valves 104, 106, and 108 in a manner such that the refrigerant flow to water heater 68 flows through coiled tubing heat exchanger 88. More specifically, control system 70 closes valve 106 and valve 92 and opens valves 104, 108, 100, and 98.

As discussed above, indoor unit 66 includes an air handling unit having a fan that draws air over coil 84. As indicated in FIG. 7, unit 66 also includes a variable speed fan control unit 115 in communication with control system 70 and a temperature sensor 117 that detects refrigerant temperature in the flow of refrigerant combined from the output of coil 84 and bypass valve 98. As in the air cooling/water heating mode, when the system is in air heating/water heating mode, heat exchanger coil 88 acts as a sub-cooling or sub-condensing coil, sharing the condensing function with the system condenser, the difference between the two modes of operation being that in air heating mode, coil 84, rather than coil 72, is the system condenser. As in the air cooling/water heating mode, the system in air heating/water heating mode diverts some of the hot gaseous refrigerant from compressor 76 to coil 88, bypassing the condensing coil, in order to contribute heat to the heat exchanger. And as in the air cooling mode, this is accomplished in the air heating mode by a valve that bypasses the condenser coil, in this instance valve 98. That is, valve 98 serves the function in air heating/water heating mode that valve 92 serves in air cooling/water heating mode.

As discussed above with regard to valve 92 in the air cooling/water heating mode, the opening of valve 98 in air heating/water heating mode allows hot gaseous refrigerant to flow through the bypass path, but because refrigerant flowing through condenser coil 84 is cooled, and thus has lower flow resistance than the hot refrigerant, more refrigerant tends to flow through the condenser coil than through the bypass when the air handler fan is operating at its normal speed. Accordingly, when control system 70 actuates system 60 to operate in air heating/water heating mode, the control system instructs variable fan speed controller 115 to variably control the air handler fan speed in response to temperature of the combined refrigerant flow detected at 117 to maintain the refrigerant flow at 117 at a target temperature that is pre-programmed to controller 115 and/or control system 70. The target temperature in air-heating mode may be selected independently of the air-cooling mode target temperature, as system conditions can be different. Thus, while the system actuates refrigerant heat exchanger 88, the air handler fan generally slows in speed, thereby increasing resistance to refrigerant flow through the condenser coil and forcing more refrigerant through bypass valve 98. The bypass refrigerant remains in a hot, gaseous state so that the combination of gaseous refrigerant from valve 98 and liquid refrigerant from coil 84 is in a dual-phase state as it flows to heat exchanger 88.

This refrigerant flows through open valve 108, around check valve 111, and through heat exchanger coil 88. This transfers heat from the refrigerant to the water tank and completes the condensing process, so that the refrigerant leaving coil 88 through open valve 104 is in a fully liquid state. The liquid refrigerant continues its flow through tubing 80 and valve 94, around check valve 93, to evaporator coil 72. From the evaporator coil, warmer, gaseous refrigerant flows through tubing 80, reversing valve 90, and input tubing 95 to compressor 76, and the cycle repeats.

Control system 70 makes the COP comparison as described above to determine when to alternatively operate refrigerant heat exchanger 88 or the water heater heat source. As when the system is operating in air cooling mode, the use of refrigerant heat exchanger 88 in air heating mode will generally be more efficient when the water in tank 86 is at a lower temperature. Thus, when control system 70 receives a signal from the water heater temperature sensor that the water heater is at or below its low set point temperature, control system 70 may default to operation of refrigerant heat exchanger 88 and thereafter continuously examines the efficiency comparison to determine when to switch to the water heater's operation. Again, since the target temperature to which fan controller 17 controls the refrigerant input to the heat exchanger is typically below the water heater's high set point temperature, this typically means that the refrigerant flow heat exchanger acts as a pre-heater and that final heating is effected by the water heater heat source.

It should also be recognized, in view of the present disclosure, that the reduction in the air handler fan speed during operation of refrigerant heat exchanger 88 corresponds to a reduction of heat provided to the conditioned space, thereby corresponding to a reduction in system efficiency. When the system operates in air cooling/water heating mode, the system does not experience a similar efficiency reduction, in that because conditioned air is delivered to the conditioned space from the evaporator coil rather than from the condenser coil, energy contribution to the conditioned air is relatively unaffected by the refrigerant bypass around the condenser. As apparent from the discussion above, control system 70 may therefore switch from use of heat exchanger 88 to the use of the water heater's heat source earlier in air heating/water heating mode than in air cooling/water heating mode.

In a still further embodiment, variable speed fan controller 115 and sensor 117 may be omitted from the system, and the air handler fan may operate at normal speed during actuation of heat exchanger 88 in air heating mode. This avoids the reduction in system efficiency caused by decrease in fan speed, although because of the resulting reduction in diversion of hot refrigerant to the heat exchanger through valve 98, the heat exchanger would correspondingly contribute less heat to the water heater, thereby reducing system efficiency. It will therefore be appreciated that the decision whether to utilize variable fan speed, and if so, also the selection of the target refrigerant temperature at the output of the bypass valve and the condenser coil, will influence system efficiency and, therefore, the balance between use of refrigerant heat exchanger 88 and the water heater heat source. It will also be understood that, in both air heating and air conditioning modes, decisions regarding use of fan reduction can be made, and operating parameter values optimized, through calibration of the particular air conditioning system.

In the discussion of the above-described embodiments, the control system actuates the refrigerant heat exchanger when the air conditioning system is operating either in an air cooling mode or an air heating mode. In certain embodiments, the control system only actuates the heat exchanger during an active mode of the air conditioning system, but in other embodiments the control system also actuates the refrigerant heat exchanger when the system is in an inactive mode, i.e. when running neither in air cooling mode nor air heating mode. In such embodiments, and referring for example to the system of FIGS. 4-7, if control system 70 receives a signal from the water heater temperature sensor indicating that water in the water heater has reached or fallen below the heater's low temperature set point, the control system decides whether to activate the heat exchanger or the water heater heat source, e.g., based on the COP comparison as described above, or by default to the heat exchanger. Assuming the decision is to activate the heat exchanger, the control system arranges the valves in the air conditioning system so as to operate in air heating/water heating mode, as discussed above with respect to FIG. 7, and operates the air conditioning system in the manner described above with regard to FIG. 7, except that the control system deactivates the air handler fan so that no air is drawn across coil 84 and no conditioned air is provided to the conditioned space. Correspondingly, the variable fan speed controller is inoperative. This tends to force a greater volume of hot refrigerant from the compressor through bypass valve 98, but the refrigerant flow is thereafter the same as discussed above with regard to FIG. 7. The control system does operate fan 24, since the evaporator function is needed to complete the refrigerant cycle. Since the evaporator function is needed, the control system does not select an air cooling set up, as such arrangement would cause conditioned air to be forced into the conditioned space.

In this water heating-only mode of operation, the reduced condenser capacity causes the air conditioning system to remove less heat from the refrigerant between the compressor and the evaporator than in the air conditioning modes. The increased refrigerant heat corresponds to increased flow resistance in the refrigerant circuit and, therefore, to increased compressor discharge pressure. Depending on the system configuration, this may, in turn, so decrease system efficiency or possibly inhibit the compressor's operation that use of the refrigerant flow heat exchanger does not occur or occurs for only a short time. Thus, in embodiments utilizing a water heating-only mode, compressor 76 may be a variable speed compressor so that control system 70 may reduce compressor speed when heating water with the heat exchanger but not conditioning air. For example, typical residential air conditioning systems have compressors ranging in capacity from 16,000 to 60,000 BTU/hr. In a non-air conditioning mode with water heating, however, control system 70 would lower a variable speed compressor to operate at a lower capacity, e.g. approximately 10,000 BTU/hr in a typical residential configuration. As in the air conditioning/water heating operational modes discussed above, control system 70 in a water heating-only mode again determines whether and when to switch between heating water with the refrigerant heat exchanger and heating water with the water heater heat source based on the COP comparison.

In the embodiments described above, the refrigerant heat exchanger coil is disposed downstream of the system condenser. In the embodiments discussed below with respect to FIGS. 8-13, however, the heat exchanger coil is disposed upstream from the system condenser, between the system condenser and the compressor. In these embodiments, the heat exchanger coil reduces heat of the hot gaseous refrigerant output by the compressor (and transfers this heat to the water heater), but it does not condense the refrigerant to a liquid phase. Because the heat exchanger coil receives hot refrigerant directly from the compressor, it is unnecessary to bypass the compressor output around the condenser or, therefore, to reduce condenser fan speed in order to encourage such bypass flow. That is, the system condenser fan operates at normal speed whether or not the refrigerant heat exchanger is active. This tends to increase system efficiency as compared to the embodiments described above with regard to FIGS. 1-7. In certain environments, however, the embodiments described with regard to FIGS. 1-7 may be more convenient to install, particularly into an existing air conditioning system as a retrofit.

Figure 8:
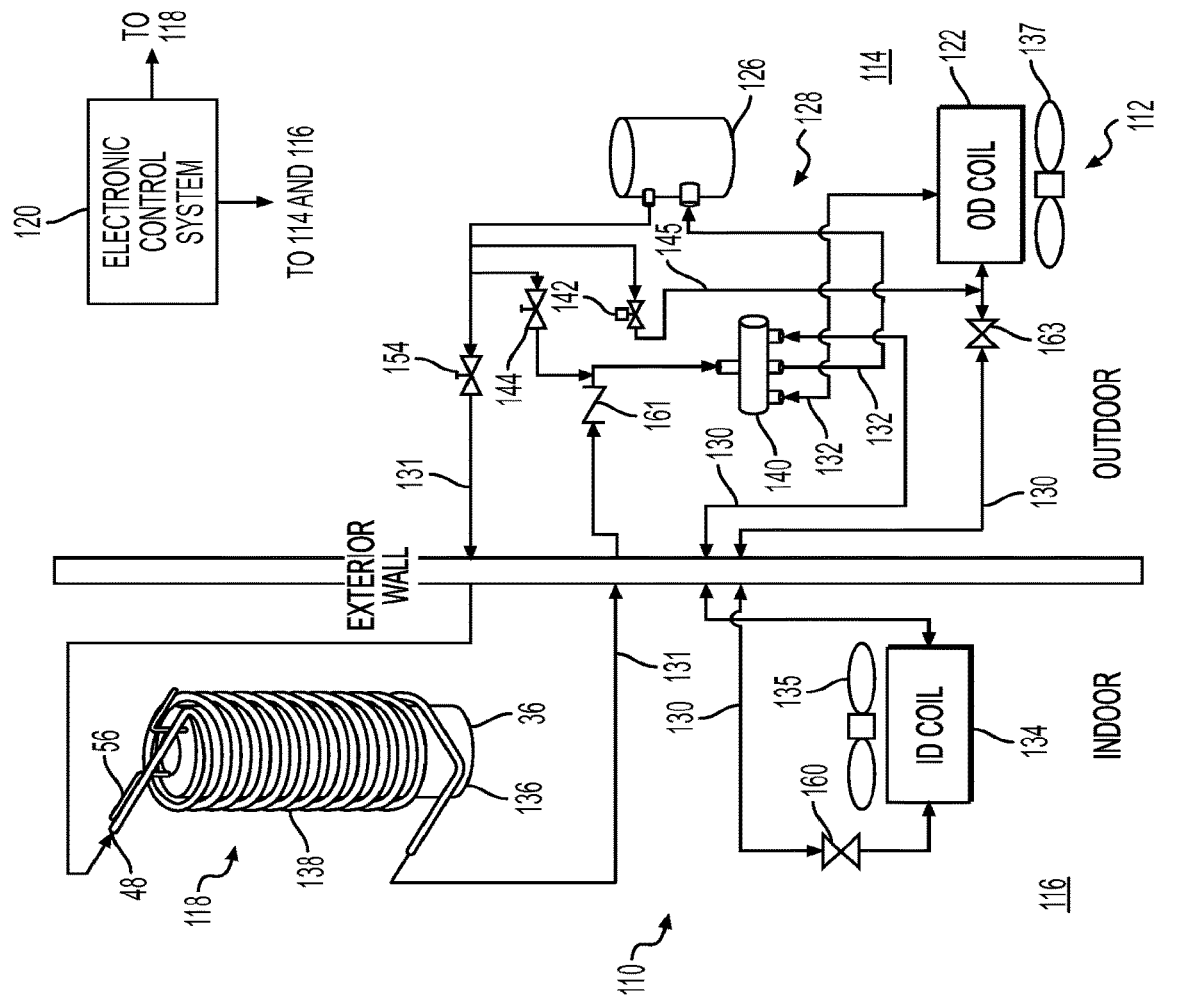
FIG. 8 is a schematic diagram of an air conditioning system according to an embodiment of the present invention.

FIG. 8 schematically depicts an air conditioning/water heater system 110 embodying principles of an embodiment of the present invention. System 110 includes (1) an air conditioning system 112 having an outdoor coil unit 114 and an indoor coil unit 116, and (2) and associated water heater 118 which, representatively, may be a gas-fired or electric water heater. In FIG. 8, air conditioning system 112 is arranged so that it may operate alternatively in air heating and air cooling modes, and may therefore also be described as a heat pump. The various functions of the air conditioning/water heater system 110 are controlled by a schematically depicted electronic control circuit 120 (shown only in FIG. 8) that operates various subsequently described components of overall system 110.

Outdoor unit 114 includes an outdoor coil 122 and associated fan 137 and a compressor 126. Condenser coil 122 and compressor 126 are coupled, as shown, by a refrigerant tubing circuit having a line portion 130 between coil 122 and a reversing valve 140 through an indoor unit coil 134 and expansion valve 160, a line portion 131 between reversing valve 140 and compressor 126 via a heat conductive copper tube that is spiral-wrapped around a metal tank portion 136 of water heater 118 and serving as a refrigerant-to-tank water heat exchanger 138 for water heater 118, and a line portion 132 between reversing valve 140 and each of coil 122 and compressor 126.

In addition to reversing valve 190, outdoor unit 114 includes an electronically controlled regulator valve 142, an expansion valve 153 at an input to outdoor coil 122 (bypassed when receiving outflow from coil 122), solenoid valves 144 and 154, and a check valve 161. Valves 154, 144, 142, and 140 are in electrical communication with electronic control system 120, which controls the actuation of these valves as discussed herein.

Figure 9:
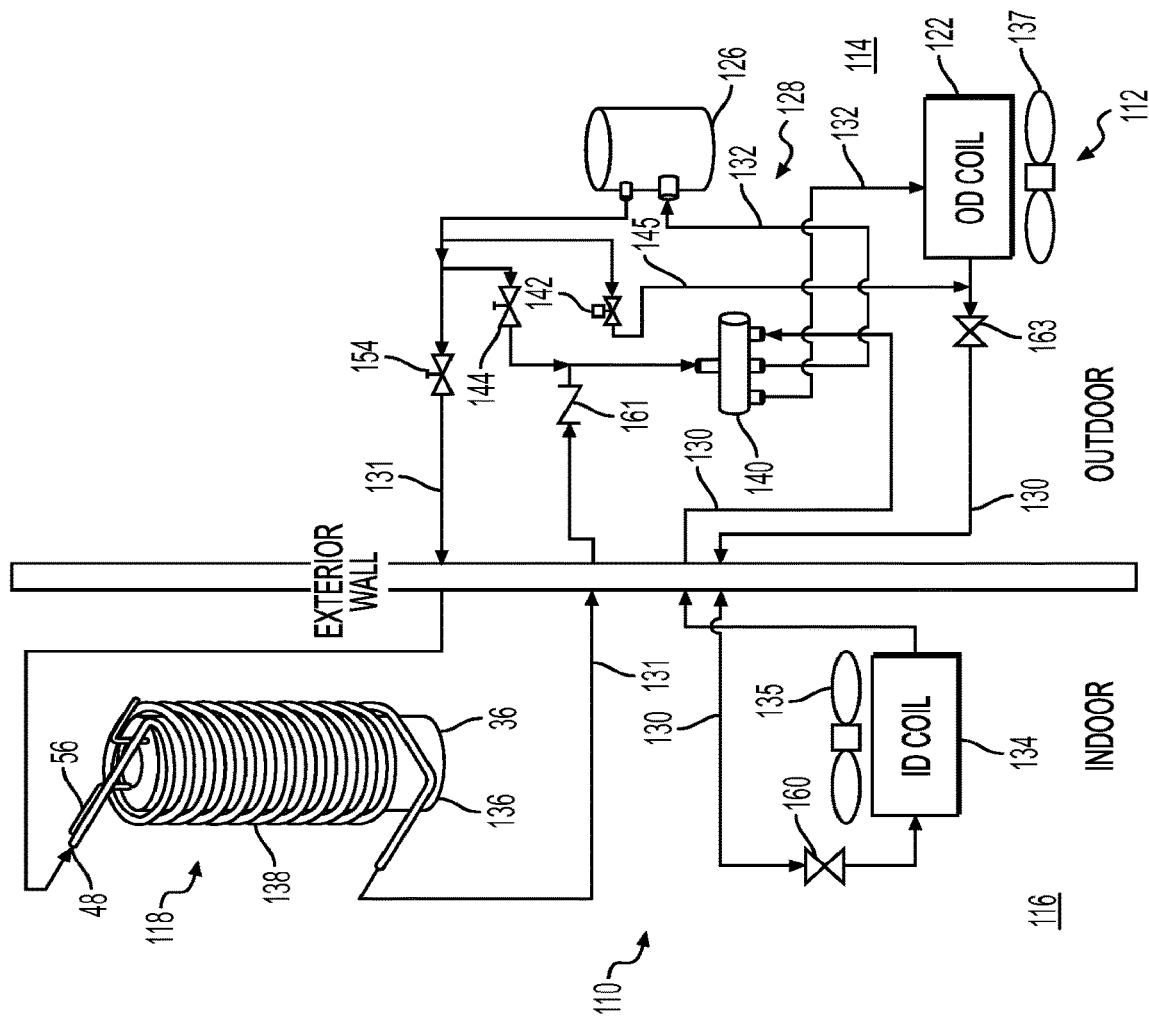
FIG. 9 is a schematic diagram of the system as in FIG. 8, but with the air conditioning system providing conditioned space air cooling without providing refrigerant heat to a water heater.

Turning now to FIG. 9, with the air conditioning/water heater system 110 in an air cooling only mode, electronic control system 120 (FIG. 8) sets valves 154, 144, and 140 in the overall tubing circuit in a manner such that compressor 126 causes refrigerant discharged therefrom to flow, via tubing portion 131, to the entry point of a tubing loop that includes heat exchanger 138 wrapped around tank 136 of water heater 118. Electronic control system 120 has closed valve 154 and opened valve 144, so that hot gaseous refrigerant flowing from compressor 126 bypasses heat exchanger 138 and flows directly to reversing valve 140. Control system 120 has set reversing valve 140 so that the reversing valve directs this refrigerant flow, via tubing line 132, to outdoor coil 122, which condenses the refrigerant in cooperation with fan 137 as discussed above. The refrigerant exits coil 122 via tubing line 130 (bypassing expansion valve 163) and enters indoor coil 134 via expansion valve 160. As discussed above, and as should be understood, expansion valve 160 lowers the pressure of the refrigerant in coil 134 so that coil 134 functions as an evaporator. An air handler fan 135 adjacent coil 134 causes air to flow over coil 134 and into the conditioned space. As discussed above, the refrigerant's change of phase in the evaporator coil from liquid to gas draws heat energy from this air, thereby causing the re-circulating air to cool the conditioned space. The now gaseous and warmer refrigerant flows from coil 134 via tubing portion 130 to reversing valve 140, which directs the gaseous refrigerant flow, via tubing portion 132, back to compressor 126, and the cycle repeats.

Figure 11:
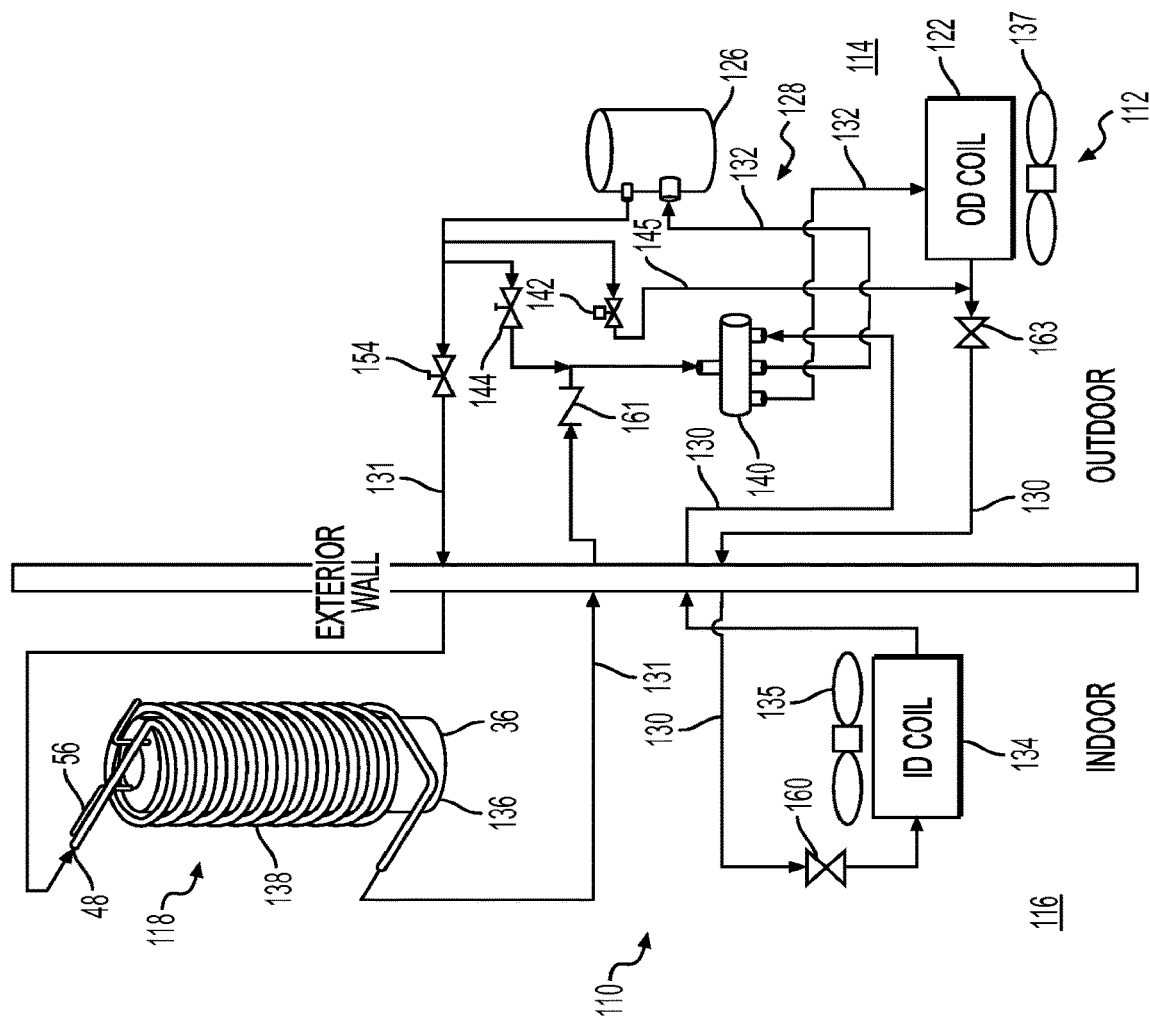
FIG. 11 is a schematic diagram of the system as in FIG. 8, but with the air conditioning system providing conditioned space air and providing refrigerant heat to a water heater.

Referring to FIG. 11, when the system is operating in air cooling mode as described above with regard to FIG. 9, and when a temperature sensor (not shown) of water heater 118 outputs a signal to electronic control system 120 indicating to the electronic control system that the water heater water has reached or fallen below the water heater's low set point temperature as stored in the electronic control system, the control system decides whether to activate the heat exchanger or the water heater heat source, e.g., based on the COP comparison as described above or by default to the heat exchanger. Assuming the decision is to activate the heat exchanger, the electronic control system closes valve 144 and opens valve 154, thereby activating refrigerant heat exchanger 138. Reversing valve 140 remains in the same setting as discussed with regard to FIG. 9. Under these conditions, hot gaseous refrigerant output from compressor 126 flows to heat exchanger 138 of water heater 118 via tubing portion 131, bypassing valve 144, and ultimately to reversing valve 140 via check valve 161. The refrigerant flows from the reversing valve to outdoor condenser coil 122, and then to expansion valve 160, indoor coil 134, reversing valve 140, and back to compressor 126, as discussed above with respect to FIG. 9.

Once the electronic control system actuates use of heat exchanger 138 or the water heater heat source, the control system continuously assesses the data sets/COP comparison. If the resulting ratio drops below 1.0, the control system deactivates initially selected heat source and activates the other heat source. As noted above, system 110 (with heat exchanger 138 active) is generally more efficient than the system described above with respect to FIG. 2 or FIG. 5, in that reduction of fan speed for condenser coil 122 is unnecessary in air conditioning/water heating mode. Counterbalancing that positive efficiency effect is the longer refrigerant tubing line 131 needed between the compressor and the water heater, but this effect is often offset and even overcome by the increase in efficiency caused by the cooling effect the refrigerant experiences as it travels through heat exchanger 138. Accordingly, in most instances, operation of the system illustrated in FIG. 11 results in a positive system efficiency ratio, as compared to operation of the system and water heater heat source independently of each other, for a longer rise in temperature of water in water heater tank 136 than does the systems described above with regard to FIG. 2 and FIG. 5. In addition, since the water heater receives hot gaseous refrigerant directly from compressor 126, without need to regulate the refrigerant temperature being directed to the heat exchanger to a lower target temperature, as described above with regard to FIGS. 2 and 5, the heat exchanger illustrated in FIG. 11 can transfer more heat to the water heater, thereby maintaining a positive contribution to system efficiency over a longer temperature range. Nonetheless, as long as the temperature of refrigerant flowing from the compressor to heat exchanger 138 is below the water heater's high temperature set point, the efficiency comparison will eventually favor operation of the water heater's heat source, causing the system to deactivate water heater heat exchanger 138 and activate the water heater's inherent heat source. That is, under such circumstances, the water heater heat source will always bring the water heater water to the final high set point, and heat exchanger 138 serves as a pre-heater. Again, however, if the temperature of gaseous refrigerant from compressor 126 is at or higher than the water heater high set point, it is possible that heat exchanger 138 can be used to bring the water heater fully to its high set point.

Electronic control system 120 monitors pressure at the output of compressor 12 and, if the monitored pressure exceeds a predetermined pressure (provided by the compressor manufacturer or by user selection, for example after a calibration process), control system 120 may switch valve 142 from a closed to an opened state, allowing refrigerant flow through a tubing portion 145, bypassing heat exchanger 138 and condenser coil 122, to the lower pressure of the evaporator. In one embodiment, and depending on the compressor capacity, control system 120 may selectively open proportional valve 142 whenever the compressor output pressure reaches or exceeds 550 psi. As will be understood in the context of the present disclosure, this reduces system efficiency, in that it diverts heat from transfer to the water heater and reduces the evaporator efficiency, and accordingly valve 142 is metered to minimize its impact.

Figure 10:
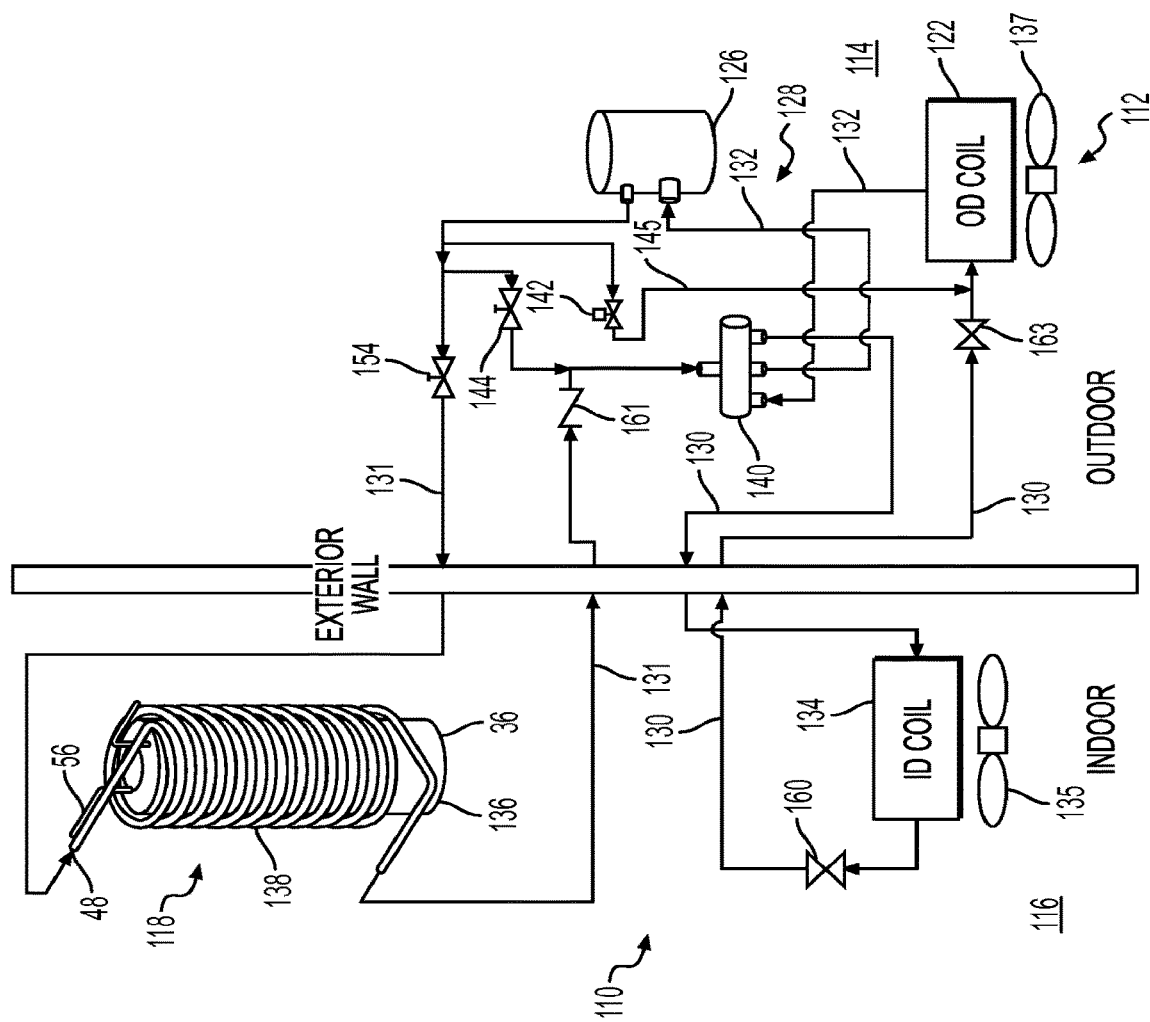
FIG. 10 is a schematic diagram of the system as in FIG. 8, but with the air conditioning system providing conditioned space air heating without providing refrigerant heat to a water heater.

If control system 120 changes, either by manual or electronic control, from air cooling to air heating modes, without water heating and with reference to FIG. 10, control system 120 closes valve 154, opens valve 144, and sets reversing valve 140 to direct refrigerant flow from tubing line 131 to indoor coil 134 via tubing line 130 and to direct refrigerant flow from coil 122 via line 132 back to compressor 126 via tubing line 132. In operation, hot gaseous refrigerant flows from compressor 126 through tubing line 131 and open valve 144, bypassing heat exchanger 138 due to closed valve 154. Reversing valve 140 directs the gaseous refrigerant to indoor coil 134 via tubing line 130. Coil 134 acts as a condenser coil, cooling and condensing the refrigerant to liquid phase as air handler fan 135 moves air over the coils and into the conditioned space. The re-circulating building air draws heat energy from the refrigerant as it condenses, thereby providing a heating effect to the conditioned space. Leaving coil 134 through tubing line 130 (and bypassing expansion valve 160), the now-liquid refrigerant flows to coil 122 through expansion valve 163. The expansion valve lowers the refrigerant's pressure, causing outdoor coil 122 to act as an evaporator, in which the refrigerant changes phase to a gas and draws heat energy from outdoor ambient air drawn over the coils by outdoor unit fan 137. The now-warm gaseous refrigerant flows from coil 122 to reversing valve 140, which directs the refrigerant flow back to compressor 126 via tubing line 132, and the cycle repeats.

Figure 12:
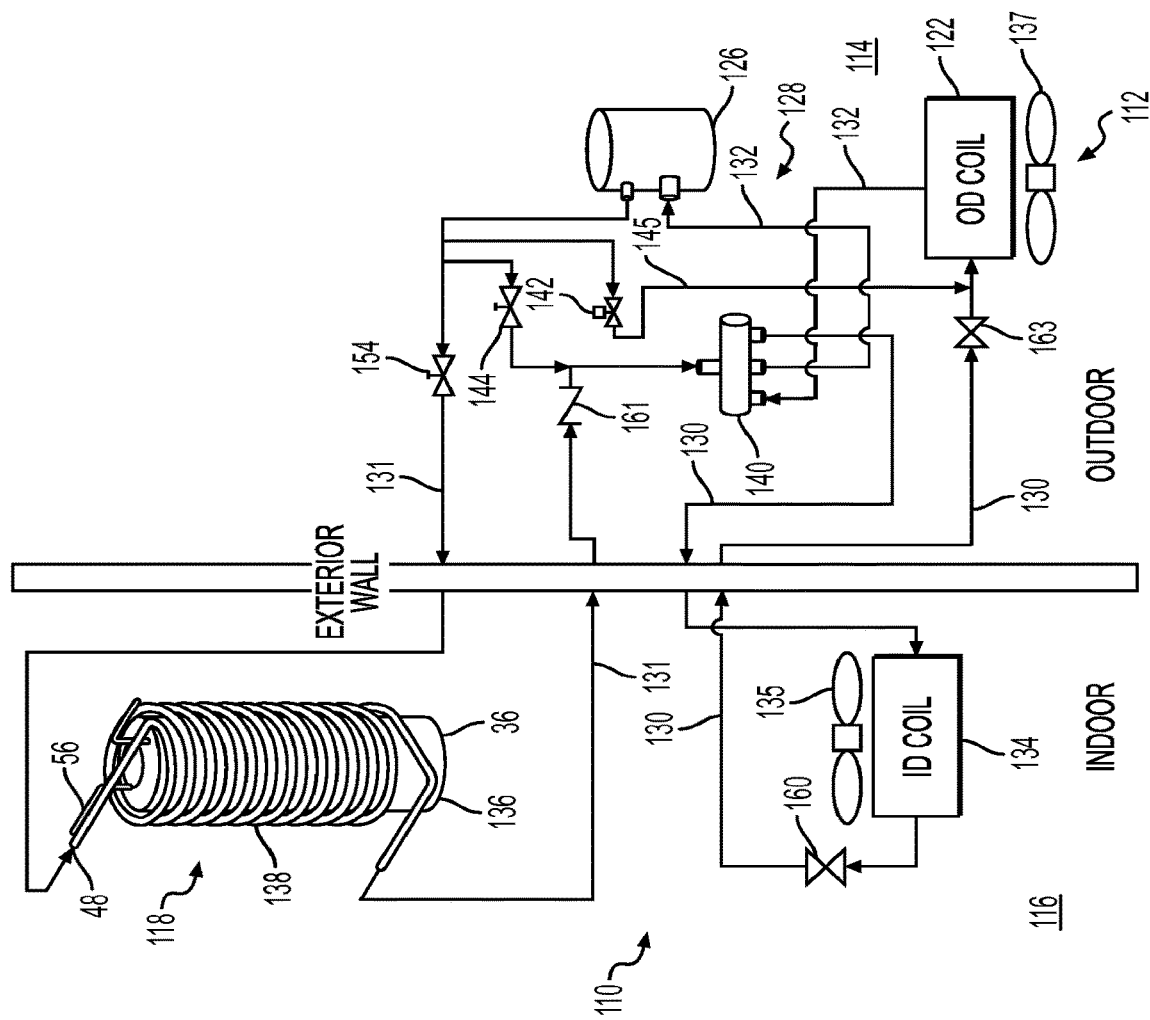
FIG. 12 is a schematic diagram of the system as in FIG. 8, but with the air conditioning system providing conditioned space air and providing refrigerant heat to a water heater.

Referring now to FIG. 12, when electronic control system 120 receives a signal from the water heater water temperature sensor (not shown) indicating that the water heater water temperature has fallen below the water heater's low set point, when the air conditioning system is in air heating mode as discussed above with regard to FIG. 10, control system 120 decides whether to activate the heat exchanger or the water heater heat source, e.g. based on the data sets/COP comparison as described above, or by default to the heat exchanger. Assuming the decision is to activate the heat exchanger, the control system closes valve 144 and opens valve 154, thereby activating heat exchanger 138 by including the heat exchanger and its related portion of tubing section 131 in the refrigerant flow loop. As described above, this causes hot gaseous refrigerant to flow from compressor 126 to and through heat exchanger coil 138 via tubing section 131 and thereafter to reversing valve 140 via check valve 161. The refrigerant's flow from reversing valve 140, to indoor coil 134, expansion valve 163, outdoor coil 122, reversing valve 140, and back to compressor 126 occurs as discussed above with regard to FIG. 10.

Again, when electronic control system 120 receives the signal from the water heater water temperature sensor indicating that water heating is needed, the electronic control system may initially activate refrigerant heat exchanger 138 rather than the water heater's inherent heat source, when the air conditioning system is operating in either air heating mode or air cooling mode, by default or by the COP comparison. FIGS. 9 and 11 illustrate the transition from air cooling-only mode to air cooling/water heating mode, while FIGS. 10 and 12 illustrate the transition from air heating-only mode to air heating/water heating mode. Continuing the discussion of the latter transition, once the electronic control system has actuated the refrigerant heat exchanger, the electronic control system thereafter continuously monitors the COP comparison of system efficiency with operation of refrigerant water heater 138, and without operation of the water heater's heat source, to system efficiency with refrigerant flow heat exchanger 138 deactivated and the water heater's inherent heat source activated. If this ratio drops below 1.0 as the system operates, the electronic control system deactivates refrigerant flow heat exchanger 138 (by closing valve 154 an opening valve 144), and activates the water heater's inherent heat source. As in all of the examples described herein, electronic control system 120 continues to monitor the water temperature output signal, and if the ratio rises above 1.0 and persists for a predetermined time will switch back to activation of the refrigerant flow heat exchanger. When the water heater water temperature rises to the water heater's high set point, the water heater heat source may be deactivated by a control system on the water heater that is independent of electronic control system 120, or the heat source may be deactivated by control system 120. As discussed above with regard to air cooling mode, the temperature of refrigerant flowing from compressor 126 is also a limiting factor, as compared to the water heater's high set point. If the compressor's output refrigerant temperature is below the water heater's high set point, refrigerant flow heat exchanger 138 is always a pre-heating device. If the compressor refrigerant output temperature is higher than the water heater high set point, it is possible for refrigerant flow heat exchanger 138 to bring the water heater fully to its high set point.

As will be apparent in view of the present disclosure, operation of refrigerant flow heat exchanger 138 in an air heating/water heating mode, as described with regard to FIG. 12, results in the removal of heat from the refrigerant flow at heat exchanger 138 that might otherwise be removed at coil 134 for contribution to conditioned air for the conditioned space. This may result in a reduced system efficiency as compared to the operation of the system in an air cooling/water heating mode, thereby resulting in a shorter duration of operation of the refrigerant heat exchanger in air heating/water heating mode than in a air cooling/water heating mode.

Valve 142 is operated by control system 120 in this mode in the same manner as discussed above with respect to FIGS. 9 and 11.

Figure 13:
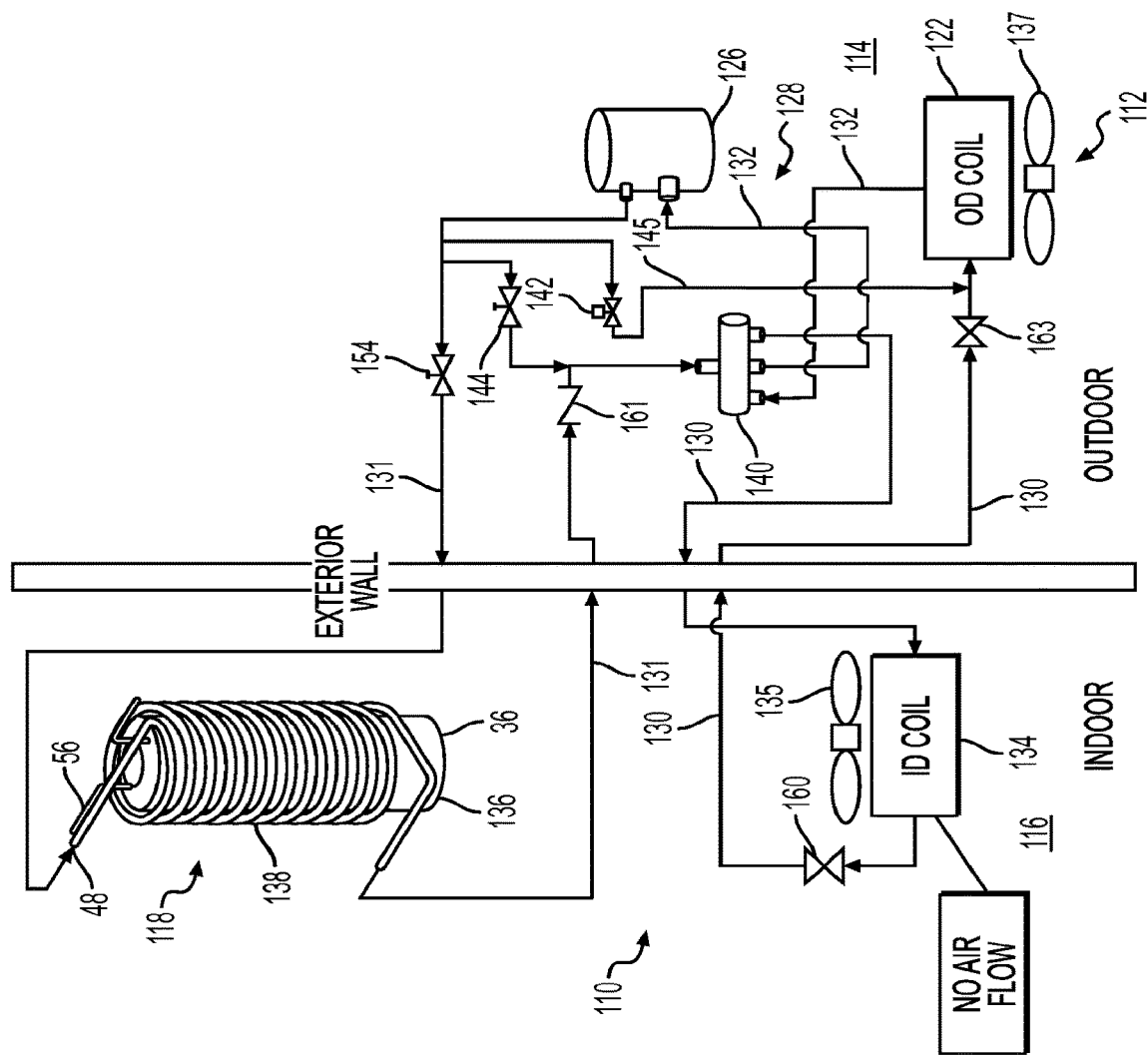
FIG. 13 is a schematic diagram of the system as in FIG. 8, but with the air conditioning system providing refrigerant heat to a water heater without providing conditioned space air.

Referring to FIG. 13, electronic control system 120 receives a signal from the water heater water temperature sensor indicating that water heating is needed, when system 110 is in neither an air heating mode nor an air cooling mode, control system 120 sets valves 154, 144, and 140 to an air heating configuration, as discussed above with regard to FIG. 12, but does not activate air handler fan 135 because there is no call from the indoor thermostat to provide conditioned air to the conditioned space. Refrigerant flows through the refrigerant loop as described with regard to FIG. 12.

Again, because refrigerant heat exchanger 138 receives hot refrigerant gas directly from compressor 126, the system's ability to contribute heat to the water heater remains high in this mode of operation. However, the deactivation of air handler fan 135 eliminates the corresponding air flow over condenser coil 134, thereby reducing the system's ability to remove heat from the circulating refrigerant flow. This may undesirably increase pressure at the output of compressor 126. Where compressor 126 is a variable speed compressor, the control system changes the compressor's output to a lower level, e.g. 10,000 BTU/hr. Alternatively, electronic control system 120 opens bypass valve 142. This causes hot refrigerant gas from compressor 126 to bypass heat exchanger 138 and coil 134 and flow directly to coil 122 for return to compressor 126. As described above, the opening of bypass valve 142 may further decrease system efficiency, thereby increasing the likelihood of a switch to water heater activation.

It should be understood that the present system may be operated in various manners. For example, as discussed above, each of the embodiments described with regard to FIGS. 1-13 can be operated based on a comparison of system efficiency when using the refrigerant heat exchanger to system efficiency when using the water heater's heat source, and relying on that comparison as the deciding factor whether to utilize the heat exchanger throughout the water heater's heat cycle. Rather than relying on the efficiency comparison, however, in a further embodiment the electronic control system, upon receiving a signal from the water heater temperature sensor indicating a need to heat water, actuates the refrigerant heat exchanger coil and maintains the heat exchanger coil active until the temperature signal reaches a predetermined point. This predetermined cut-off point may be determined through testing and comparison of system efficiencies alternatively utilizing the refrigerant flow heat exchanger and the water heater heat source. That is, the systems are operated under each of the alternative arrangements, and under similar operating conditions. System efficiencies are compared, and a temperature cut off is selected based on the comparison. Furthermore, temperature may be measured at various points in the water heater, as should be understood in the art, and in certain embodiments the electronic control system responds to water temperature taken at the lower portion of the lower tank.

Still further, in optional constructions of the air conditioning and water heating systems described above, the electronically controlled regulator valves may be replaced with fixed orifice solenoid valves, and the flow of hot refrigerant to the water heater refrigerant-to-water heat exchanger coils may instead be regulated by compressor discharge (head) pressure using an outdoor or indoor fan speed controller which is, in turn, controlled by the sensed water temperature in the water heater tank.

Modifications and variations to the particular embodiments of the present invention may be practiced by those of ordinary skill in the art, without departing from the spirit and scope of the present invention, which is more particularly set forth in the appended claims. In addition, it should be understood that aspects of the various embodiments may be interchanged to both in whole or in part. Furthermore, those of ordinary skill in the art will appreciate that the foregoing description is by way of example only and is not intended to limit the invention so further described in the appended claims.

What is claimed is:

1. An apparatus for heating water, comprising:
 a tank for storing water and having a heat source, wherein the heat source comprises one of an electric heating element and a gas burner;

a heat exchanger in thermal communication with the tank and configured to receive refrigerant and transfer heat therefrom to the tank;

an air conditioning system comprising an air handler actuatable to move an air flow through an air flow path into a conditioned space, a refrigerant path having a first portion that passes through the air flow path, a second portion that passes through the heat exchanger, and a third portion that exchanges heat with a space exterior to the conditioned space, and a pump disposed in the refrigerant path and being actuatable to move refrigerant through the refrigerant path, the pump disposed such that the refrigerant exiting the pump passes through either the first portion or the third portion of the refrigerant path before passing through the second portion of the refrigerant path;

a plurality of sensors comprising:

a first temperature sensor positioned for thermal communication with water in the tank and operable to output a first signal corresponding to a temperature of water in the tank;

a second temperature sensor disposed proximate the refrigerant path and operable to detect a temperature of ambient air proximate the refrigerant path and output a second signal corresponding to the temperature of ambient air; and a third temperature sensor operable to detect a temperature of air in the conditioned space and to output a third signal corresponding to the temperature of air in the conditioned space; and a control system comprising at least one controller in operative communication with the plurality of sensors to receive the first signal, the second signal, and the third signal, in operative communication with the tank, in operative communication with the air handler, and in operative communication with the refrigerant path, and a computer-readable medium containing program instructions executable by the at least one controller to control operations of the at least one controller, to control operations of the heat source, to control actuation of the air handler, and to control refrigerant flow, and wherein, the program instructions are configured so that the control system, in response to the signals from the plurality of sensors and an application of data corresponding to the respective signals to a predetermined relationship between respective operating parameters, determines a ratio between a first coefficient of performance and a second coefficient of performance, the first coefficient of performance and the second coefficient of performance being determined based on the temperature of water in the tank, the temperature of ambient air, and the temperature of air in the conditioned space, the first coefficient of performance representative of efficiency of the apparatus using the heat exchanger and the second coefficient of performance representative of efficiency of the apparatus using the heat source, and in response to determining the ratio is greater than 1.0, allows refrigerant flow through the second portion and de-actuates the heat source, and in response to determining the ratio is less than 1.0, blocks refrigerant flow through the second portion and actuates the heat source.

2. The apparatus as in claim 1, wherein the second portion of the refrigerant path includes a bypass that permits a portion of the refrigerant to flow through the second portion and another portion of the refrigerant to bypass the second portion.

3. The apparatus as in claim 1, wherein the air handler comprises a variable speed fan.

4. An apparatus for heating water, comprising:

a tank for storing water and having a heat source, wherein the heat source comprises one of an electric heating element and a gas burner;

a heat exchanger in thermal communication with the tank and configured to receive refrigerant and transfer heat therefrom to the tank;

an air conditioning system comprising an air handler actuatable to move an air flow through an air flow path into a conditioned space, a refrigerant path having a first portion that passes through the air flow path, a second portion that passes through the heat exchanger, and a third portion that exchanges heat with a space exterior to the conditioned space, a pump disposed in the refrigerant path and being actuatable to move refrigerant through the refrigerant path, the pump disposed such that the refrigerant exiting the pump passes through either the first portion or the third portion of the refrigerant path before passing through the second portion of the refrigerant path, and a valve system within the refrigerant path that controls refrigerant flow in the first portion and the second portion and that is selectively configurable to alternatively allow refrigerant flow through the second portion and block refrigerant flow in the second portion, the valve system being selectively configurable between a first state and a second state, the first state directing refrigerant from the pump through the first portion, then through the second portion, and back to the pump, the second state directing refrigerant from the pump through the second portion, then through the first portion, and back to the pump;

a plurality of sensors, each outputting a respective signal representative of a respective system operating parameter that varies in a predetermined relationship with operating efficiency of at least one of the tank and the air conditioning system; and a control system in operative communication with the tank to control operation of the heat source, in operative communication with the air handler to control actuation of the air handler, in operative communication with the sensors to receive the respective signals, and in operative communication with valve system to control refrigerant flow, and wherein, in response to the respective signals from the sensors and an application of data corresponding to the respective signals to a predetermined relationship between the respective operating parameters, determines a ratio between a first coefficient of performance and a second coefficient of performance, the first coefficient of performance representative of efficiency of the apparatus using the heat exchanger and the second coefficient of performance representative of efficiency of the apparatus using the heat source, and in response to determining the ratio is greater than 1.0, the control system actuates the valve system to allow refrigerant flow through the second portion or block refrigerant flow through the second portion and de-actuates the heat source.

5. The apparatus as in claim 4, wherein the plurality of sensors comprises a thermostat that is operable to detect an air temperature of the conditioned space and output a signal to the control system that corresponds to the temperature.

6. The apparatus as in claim 4, wherein the plurality of sensors comprises a temperature sensor in thermal communication with water in the tank and that is operable to output a signal to the control system that corresponds to a temperature of the water.

7. The apparatus as in claim 4, wherein the plurality of sensors comprises a temperature sensor disposed proximate the refrigerant path and is operable to detect a temperature of ambient air proximate the refrigerant path and output a signal to the control system that corresponds to the temperature.

8. The apparatus as in claim 4, wherein the second portion of the refrigerant path includes a bypass that permits a portion of the refrigerant to flow through the second portion and another portion of the refrigerant to bypass the second portion.

9. The apparatus as in claim 4, wherein the air handler comprises a variable speed fan.

10. An apparatus for heating water, comprising:
a tank for storing water and having a heat source, wherein the heat source comprises one of an electric heating element and a gas burner;
a heat exchanger in thermal communication with the tank and configured to receive refrigerant and transfer heat therefrom to the tank;
an air conditioning system operative to utilize refrigerant flowing through a refrigerant circuit portion of the air conditioning system to regulate temperature of air being delivered to a conditioned space, wherein the refrigerant circuit portion is in fluid communication with the heat exchanger so that refrigerant flowing through the refrigerant circuit portion flows through the heat exchanger, the refrigerant circuit portion having a first portion passing through an air flow path of the air conditioning system and a second portion passing through the heat exchanger;
a valve system being selectively configurable between a first state and a second state, the first state directing refrigerant from the pump through the first portion, then through the second portion, and back to the pump, the second state directing refrigerant from the pump through the second portion, then through the first portion, and back to the pump; and
a control system in operative communication with the air conditioning system to control operation of the air conditioning system and in operative communication with the tank to control operation of the heat source, wherein
in response to determining a ratio between a first coefficient of performance and a second coefficient of performance, the first coefficient of performance representative of efficiency of the apparatus using the heat exchanger and the second coefficient of performance representative of efficiency of the apparatus using the heat source, the control system is configured to selectively direct flow of the refrigerant flowing through the refrigerant circuit portion to the heat exchanger and block flow of refrigerant flowing through the refrigerant circuit portion from flowing through the heat exchanger,
in response to determining the ratio is greater than 1.0, the control system is configured, in a first mode of operation, to direct flow of the refrigerant flowing through the refrigerant circuit portion to the heat exchanger and deactivate the heat source,
in response to determining the ratio is less than 1.0, the control system is configured, in a second mode of operation, to block flow of the refrigerant flowing through the refrigerant circuit portion to the heat exchanger and activate the heat source.

11. The apparatus as in claim 10, further comprising a thermostat that provides the control system with a signal that corresponds to an air temperature of the conditioned space.

12. The apparatus as in claim 10, further comprising a temperature sensor in thermal communication with the water in the tank and that provides a signal to the control system that corresponds to a temperature of the water.

13. The apparatus as in claim 10, further comprising a temperature sensor disposed proximate the refrigerant circuit portion and is operable to detect a temperature of ambient air proximate the refrigerant circuit portion and output a signal to the control system that corresponds to the temperature.

14. The apparatus as in claim 10, wherein the refrigerant circuit includes a bypass that permits a portion of the refrigerant to flow through the heat exchanger and another portion of the refrigerant to bypass the heat exchanger.

15. The apparatus as in claim 10, wherein the air conditioning system comprises a variable speed fan.

* * * * *